(12) United States Patent
DeWeert et al.

(10) Patent No.: US 11,187,523 B1
(45) Date of Patent: Nov. 30, 2021

(54) THREE-DIMENSIONAL SHAPE ESTIMATION OF OBJECTS VIA POLARIMETRY

(71) Applicant: BAE Systems Information and Electronic Systems Integration Inc., Nashua, NH (US)

(72) Inventors: Michael J. DeWeert, Kaneohe, HI (US); Eric M. Louchard, Miami, FL (US); Reid A. Noguchi, Honolulu, HI (US); Dugan C. Yoon, Honolulu, HI (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 16/885,739

(22) Filed: May 28, 2020

(51) Int. Cl.
*G01B 11/24* (2006.01)
*G01B 11/16* (2006.01)
(Continued)

(52) U.S. Cl.
CPC ............ *G01B 11/24* (2013.01); *G01B 11/168* (2013.01); *G01J 4/04* (2013.01); *G01N 21/21* (2013.01);
(Continued)

(58) Field of Classification Search
CPC ........ G01J 4/00; G01J 4/02; G01J 4/04; G01J 2004/002; G01J 2004/004; G01J 2004/005; G01J 2004/007; G01J 2004/008; G01B 11/168; G01B 11/22; G01B 11/24; G01B 11/245; G01N 2021/217; G01S 17/00; G01S 17/02; G01S 17/04; G01S 17/06; G01S 17/08; G01S 17/10; G01S 17/14; G01S 17/18; G01S 17/26; G01S 17/32; G01S 17/34; G01S 17/36; G01S 17/42; G01S 17/46; G01S 17/48; G01S 17/50; G01S 17/58; G01S 17/66; G01S 17/88; G01S 17/89; G01S 17/894; G01S 17/90; G01S 7/024; G01S 7/025; G01S 7/026; G01S 7/34; G01S 7/4861; G01S 7/4863; G01S 7/4865; G01S 7/4866; G01S 7/4868; G01S 7/487; G01S 7/4873; G01S 7/4876;
(Continued)

(56) References Cited

U.S. PATENT DOCUMENTS 3,669,540 A * 6/1972 Rattman et al. ........ G01S 17/10
356/5.01
3,689,156 A * 9/1972 Kerpchar ................ G01S 17/18
356/5.04
(Continued)

OTHER PUBLICATIONS

Larry Li, Time-of-Flight Camera—An Introduction, Texas Instruments Technical White Paper SLOA190B, (Revised May 2014).
(Continued)

*Primary Examiner* — Gordon J. Stock, Jr.
(74) *Attorney, Agent, or Firm* — Sand, Sebolt & Wernow LPA

(57) ABSTRACT

Systems and methods for three-dimensional (3D) shape estimation of objects embedded in light-scattering media via polarimetry are provided. The systems and methods utilize polarization to exploit forward scattering in the light-scattering medium to mitigate backscatter interference (BSI).

20 Claims, 7 Drawing Sheets

(51) Int. Cl.
*G01J 4/04* (2006.01)
*G01S 7/499* (2006.01)
*G01S 17/18* (2020.01)
*G01N 21/21* (2006.01)
*G01S 17/89* (2020.01)

(52) U.S. Cl.
CPC .............. *G01S 7/499* (2013.01); *G01S 17/18* (2020.01); *G01S 17/89* (2013.01)

(58) Field of Classification Search
CPC ...... G01S 7/489; G01S 7/4913; G01S 7/4914; G01S 7/4915; G01S 7/4918; G01S 7/495; G01S 7/497; G01S 7/499; G06K 9/00624; G06K 9/0063; G06K 9/00637; G06K 9/00651; G06K 9/00657; G06K 9/00771; G06K 9/20; G06K 9/40; G06K 9/46; G06K 2009/2045; G06T 2207/30212; G06T 2207/30232; G06T 5/007; G06T 5/008; G06T 5/009; G06T 5/50; G06T 7/50; G06T 7/55; G06T 7/557; G06T 7/564; G06T 7/593; G06T 7/97
See application file for complete search history.

(56) References Cited

U.S. PATENT DOCUMENTS

| | | | | |
|---|---|---|---|---|
| 5,231,401 | A * | 7/1993 | Kaman | G01S 17/89 250/332 |
| 5,343,284 | A * | 8/1994 | Keeler | G01S 7/4811 348/144 |
| 6,122,404 | A * | 9/2000 | Barter | G02B 27/28 359/885 |
| 7,400,384 | B1 * | 7/2008 | Evans | G01S 7/4811 356/5.01 |
| 7,787,131 | B1 * | 8/2010 | Moran | G01B 11/2441 356/520 |
| 8,350,957 | B2 * | 1/2013 | Schechner | H04N 5/23232 348/370 |
| 9,753,140 | B2 * | 9/2017 | Cottrell | H04N 9/64 |
| 10,416,303 | B2 * | 9/2019 | Hellsten | G01S 7/292 |
| 10,620,051 | B2 * | 4/2020 | Acker | G01V 3/12 |
| 10,794,767 | B1 * | 10/2020 | Acker | G06K 9/46 |
| 2016/0150165 | A1 * | 5/2016 | Grauer | H01L 27/1203 348/280 |
| 2016/0344965 | A1 * | 11/2016 | Grauer | H04N 5/3594 |
| 2019/0018143 | A1 * | 1/2019 | Thayer | G01S 17/89 |
| 2019/0056498 | A1 * | 2/2019 | Sonn | G01S 17/931 |
| 2021/0058607 | A1 * | 2/2021 | Wang | H04N 13/296 |

OTHER PUBLICATIONS

M.J. DeWeert, Detection of Underwater Munitions via a Synoptic Imaging System, SERDP Project MR-1630 Final Report, US DoD Strategic Environmental Research and Development Program (SERDP) (2010).

M. Kawakita, et al., Gain-Modulated Axi-Vision Camera (high-speed high-accuracy depth-mapping camera), Optics Express vol. 12, No. 22, pp. 5336-5344, Optical Society of America (2004).

R. Stettner, H. Bailey and Steven Baldwin, Three Dimensional Flash LADAR Focal Planes and Time-Dependent Imaging, Advanced Scientific Concepts, Santa Barbara CA (2015).

* cited by examiner

THREE-DIMENSIONAL SHAPE ESTIMATION OF OBJECTS VIA POLARIMETRY

STATEMENT OF GOVERNMENT INTEREST

This invention was made with United States Government support under Prime Contract No. N00014-16-C-3039 awarded by the U. S. Navy. The United States Government has certain rights in this invention.

TECHNICAL FIELD

The present disclosure relates generally to the detection and characterization of objects. More particularly, the present disclosure relates to three-dimensional (3D) shape characterization of objects through the use of imagery analysis.

BACKGROUND

Electrical systems that enhance situational awareness are beneficial inasmuch as they provide information about an environment that would otherwise be difficult to detect without the system. Some exemplary systems that enhance situational awareness include electro-optical systems that can remotely estimate the three-dimensional profile of objects or terrain, such as stereoscopic imagers, point-cloud light amplification detection and ranging (LIDAR) systems, time-resolved LIDAR systems, and LIDAR-based time of flight (ToF) imaging systems.

However, each of the above systems has drawbacks. For example, stereoscopic systems rely on a significant separation of multiple cameras, inherently limiting their precision as range-to-target increases. Point-cloud LIDARs provide one range estimate per image pixel per laser pulse, so that many precisely-arranged laser pulses are required for object-shape determination. Time-resolved imaging LIDAR systems, such as three-dimensional (3D) Flash LIDARs, require temporally-brief laser pulses and extremely precise timing. Precise 3D shape determination requires expensive equipment and, under the current state of the art, provides limited range samples per pixel, and fewer horizontal pixels than conventional imaging LIDARs. Laser-based ToF systems can provide range/shape information for many-pixel images, but are susceptible to backscatter interference, which can limit precise ranging to each pixel in an image, especially at longer ranges in turbid media.

SUMMARY

In some instances, efficiently determining the three-dimensional (3D) shape of objects with fine spatial resolution is difficult. The present disclosure addresses these and other issues. Generally, a remote imaging system capable of providing precise ranges to determine the 3D shape of objects with fine spatial resolution, in the fewest looks possible, is desirable, especially if the system can simultaneously provide other information relevant to discriminating among objects of interest and clutter. One such system is a polarimetric light detection and ranging (LIDAR) system including a polarized laser and two or more range-gated imaging receivers providing orthogonal polarization information. The present disclosure utilizes LIDAR polarimetry to provide improved Time-of-Flight (ToF) ranging methods for precisely determining the 3D shapes of objects embedded in scattering media.

More particularly, the LIDAR system of the present disclosure utilizes an imaging detector that analyzes polarization changes in reflected polarized light over sets of image pairs collected in a manner that enables at least the registration of reflectance, polarization, shape, and range-to-target images as more fully described below. Conventional imaging systems utilize non-polarized range-gate imaging with multiple cameras.

The LIDAR polarimetry system of the present disclosure utilizes various types of polarization, including, but not limited to, linear polarization, circular polarization, and elliptical polarization to accurately estimate the depths or ranges of objects of interest. Linear polarization of electromagnetic radiation is a confinement of the electric field vector or magnetic field vector to a given plane along the light propagation direction. The polarization state of an electromagnetic wave is defined by the direction of the electric field vector. For example, if the electric field vector is vertical (alternately up and down as the wave travels), the radiation is said to be vertically polarized.

Linear polarization is a special case of elliptical polarization. In elliptical polarization, the tip of the electric field vector varies in time, tracing an ellipse in the plane normal to the light propagation direction. The total electromagnetic field can be resolved into a superposition of two linearly-polarized waves with their electric fields at right angles to each other, defining the major axis and minor axis of the ellipse. In linear polarization, the minor axis approaches zero length. A degree of linear polarization (DOLP) is a quantity used to describe the ratio of intensity of the linearly polarized components of an electromagnetic wave (such as a laser beam) to the total intensity thereof. A perfectly linearly polarized wave has a DOLP of 100%, whereas an unpolarized wave has a DOLP of 0%. A wave which is partially polarized, and therefore can be represented by a superposition of a polarized and unpolarized component, will have a DOLP somewhere in between 0 and 100%. DOLP is calculated as the fraction of the total power that is carried by the polarized component of the wave.

Similarly, circular polarization is a special case of elliptical polarization in which the minor axis equals the major axis. In addition to the ratio of minor to major axis lengths, and the orientation of the major axis, elliptical polarization is characterized by the rotation direction of the electric field along the polarization ellipse. The field may rotate either right-handedly or left-handedly with respect to the direction of propagation. In technical discussions, this handedness is also called chirality. Thus, there are two different directions of circular polarization, distinguished by chirality. Elliptical polarization states are further distinguished by the ratio of major to minor axes, and by the direction of the major axis, in addition to the chirality.

DOLP can be used to distinguish circularly-polarized chirality, by using optical components known as quarter-wave plates (QWPs) to convert circular polarization to linear polarization. This enables detection in which a DOLP quantifies the degree of circular polarization (DOCP). The process may be further generalized to discriminate different elliptical polarization states via combinations of beam splitters, linear polarizers, and wave plates. Similarly, elliptical polarization may be resolved into a combination of linear components by using a combination of wave plates and beam splitters, and DOLP can be computed for those linear components. Thus, DOLP can be made sensitive to changes in linear, circular, or elliptical polarization, to compute the Degree of Polarization (DOP), which is a quantity used to describe the ratio of intensity of the polarized components of an electromagnetic wave (such as a laser beam) to the total intensity thereof, for those polarization types. It should be noted that the DOP may also be referred to as the polarization intensity.

In scattering media, there can be differences between polarization types in the rates at which an initially perfectly-polarized beam is scattered into a combination of polarization states. In particular, the rate of conversion of light of one circular polarization into light of the opposite circular polarization may occur over a greater distance than for conversion of a linearly polarized beam into other linear polarizations. This difference in depolarization rates will enable determination of 3D shape at greater distances by using the optimal combination of laser and receiver polarizations.

Because different materials reflect polarized light differently, illuminating a scene with polarized light and recording the polarization state of the reflected radiation can discriminate various objects of interest. Accurately registering polarization information with precise range to target and 3D shape information would enhance the discriminatory power.

By using a pulsed laser illuminator and range-gated cameras, environmental backscatter interference (BSI) is minimized. Polarized imagery of objects of interest provides further mitigation of BSI. Range-gated polarimetry has proven useful, for example, in remote imaging of objects in the ocean, and for discriminating between objects on land.

In one aspect, an exemplary embodiment of the present disclosure may provide a method for polarimetric ranging to an object embedded in a light-scattering medium, comprising generating polarized light via a polarized light source, polarizing a first range-gated imager relative to the polarized light, polarizing a second range-gated imager relative to the polarized light, transmitting the polarized light from the polarized light source into the light-scattering medium toward the object, receiving reflected light from the object, generating a set of polarized images including the object, based, at least in part on the reflected light, characterizing a depolarization rate of the light-scattering medium, based, at least in part, on the reflected light, determining a dependence of a degree of polarization (DOP) on a range to at least one pixel on the object; wherein the dependence of the DOP on the range to the at least one pixel on the object is based, at least in part, on the depolarization rate of the light-scattering medium, varying a gain of the first-range gated imager and a gain of the second range-gated imager to increase sensitivity of the dependence of the DOP on the range to the at least one pixel on the object, computing the range to the at least one pixel on the object in the set of polarized images, and estimating a three-dimensional (3D) shape of the object based, at least in part, on the computed range to the at least one pixel on the object in the set of polarized images.

The method further includes characterizing backscatter interference received by the first range-gated imager and the second range-gated imager; wherein the varying the gain of the first range-gated imager and the second range-gated imager reduces the backscatter interference received by the first range-gated imager and the second range-gated imager; and wherein the varying the gain of the first range-gated imager and the gain of the second range-gated imager reduces the dependence of the DOP on the range to at least one pixel on the object.

The method further includes characterizing backscatter interference received by the first range-gated imager and the second range-gated imager; wherein the varying the gain of the first range-gated imager and the second range-gated imager increases the dependence of the DOP on the range to the at least one pixel on the object, and reducing the backscatter interference via modeling.

The method further includes characterizing an attenuation rate of the light-scattering medium, based, at least in part, on the reflected light; wherein the dependence of the DOP on the range to the at least one pixel on the object is based, at least in part, on the attenuation rate of the light-scattering medium.

The method further includes co-polarizing one of the first range-gated imager and the second range-gated imager, and cross-polarizing the other of the first range-gated imager and the second range-gated imager.

In one aspect, an exemplary embodiment of the present disclosure may provide a method for polarimetric ranging to an object embedded in a light-scattering medium, comprising transmitting a polarized light source into the light-scattering medium toward the object, polarizing a first range-gated imager relative to the polarized light source, polarizing a second range-gated imager relative to the polarized light source, setting a delay range between the first range-gated imager and the second range-gated imager, receiving reflected radiation from the object with the first range-gated imager and the second range-gated imager, generating a set of polarized images including the object based, at least in part, on the reflected radiation, characterizing backscatter interference received by the first range-gated imager and the second range-gated imager, determining a ratio of at least two polarized images of the set of polarized images, arranging the ratio of the at least two polarized images to reduce the backscatter interference, computing a range to at least one pixel on the object in the at least two polarized images, based, at least in part, on the ratio of the at least two polarized images, and estimating a three-dimensional (3D) shape of the object based, at least in part, on the computed range to the at least one pixel on the object in the at least two polarized images.

The method further includes utilizing at least one linear combination of polarized images in the at least two polarized images. The method further includes cross-polarizing the first range-gated imager and the second range-gated imager relative to the polarized light source; wherein the at least two polarized images are cross-polarized.

The method further includes oppositely polarizing the first range-gated imager relative to the second range-gated imager; wherein at least one of first range-gated imager and the second range-gated imager is cross-polarized; oppositely polarizing at least one of the range-gated imager and the second range-gated imager relative to the polarized light source; wherein at least one of the at least two polarized images is cross-polarized, and including the at least one cross-polarized image in a numerator of the ratio of the at least two polarized images.

The method further includes generating a response-range curve to the at least one pixel on the object; wherein the at least two polarized images are generated from a decreasing portion of the response-range curve. The method further includes convolving gate ranges of the first range-gated imager and the second range-gated imager with a pulse shape of the polarized light source.

In one example, the method further includes setting gate widths of the first range-gated imager and the second range-gated imager equal to a pulse width of the polarized light source. In another example, the method further includes setting gate widths of the first range-gated imager and the second range-gated imager different to a pulse width of the polarized light source. In yet another example, the method further includes setting gate widths of the first range-gated imager and the second range-gated imager different to one another.

In one aspect, an exemplary embodiment of the present disclosure may provide a system for polarimetric ranging to an object embedded in a light-scattering medium, comprising a polarized light source, a first range-gated imager; wherein the first range-gated imager is polarized relative to the polarized light source, a second range-gated imager; wherein the second range-gated imager is polarized relative to the polarized light source, and at least one processor for: generating a set of polarized images including the object based, at least in part, on reflected light received by the first range-gated imager and the second range-gated imager, characterizing a depolarization rate of the light-scattering medium, based, at least in part, on the reflected light, reducing backscatter interference, computing a range to at least one pixel on the object in the set of polarized images, and estimating a three-dimensional (3D) shape of the object based, at least in part, on the computed range to the at least one pixel on the object in the set of polarized images.

The at least one processor further determines a dependence of a degree of polarization (DOP) on the range to the at least one pixel on the object in the set of polarized images; wherein the dependence of the DOP on the range to the at least one pixel on the object is based, at least in part, on the depolarization rate of the light-scattering medium; and wherein the reducing the backscatter interference is accomplished by varying a gain of the first range-gated imager and a gain of the second range-gated to reduce the dependence of the DOP on the range to the at least one pixel on the object.

The at least one processor further determines a dependence of a degree of polarization (DOP) on the range to the at least one pixel on the object in the set of polarized images; wherein the dependence of the DOP on the range to the at least one pixel on the object is based, at least in part, on the depolarization rate of the light-scattering medium; wherein the reducing the backscatter interference is accomplished by varying a gain of the first range-gated imager and a gain of the second range-gated to increase the dependence of the DOP on the range to the at least one pixel on the object and reducing the backscatter interference via modeling.

The at least one processor further determines a ratio of at least two polarized images of the set of polarized images; wherein the at least one processor arranges the ratio of the at least two polarized images to reduce the backscatter interference; and wherein the computing the range to the at least one pixel on the object in the at least two polarized images is based, at least in part, on the ratio of the at least two polarized images.

In one example, the at least one of the at least two polarized images is cross-polarized; and wherein the at least one processor includes the at least one cross-polarized image in a numerator of the ratio of the at least two polarized images. The at least one processor further generates a response-range curve to the at least one pixel on the object; and wherein the at least two polarized images are generated from a decreasing portion of the response-range curve.

In yet another aspect, an exemplary embodiment of the present disclosure may provide systems and methods for three-dimensional (3D) shape estimation of objects embedded in light-scattering media via polarimetry. The systems and methods utilize polarization to exploit forward scattering in the light-scattering medium to mitigate backscatter interference (BSI).

BRIEF DESCRIPTION OF THE SEVERAL VIEWS OF THE DRAWINGS

Sample embodiments of the present disclosure are set forth in the following description, is shown in the drawings and is particularly and distinctly pointed out and set forth in the appended claims.

Similar numbers refer to similar parts throughout the drawings.

DETAILED DESCRIPTION

Figure 1:
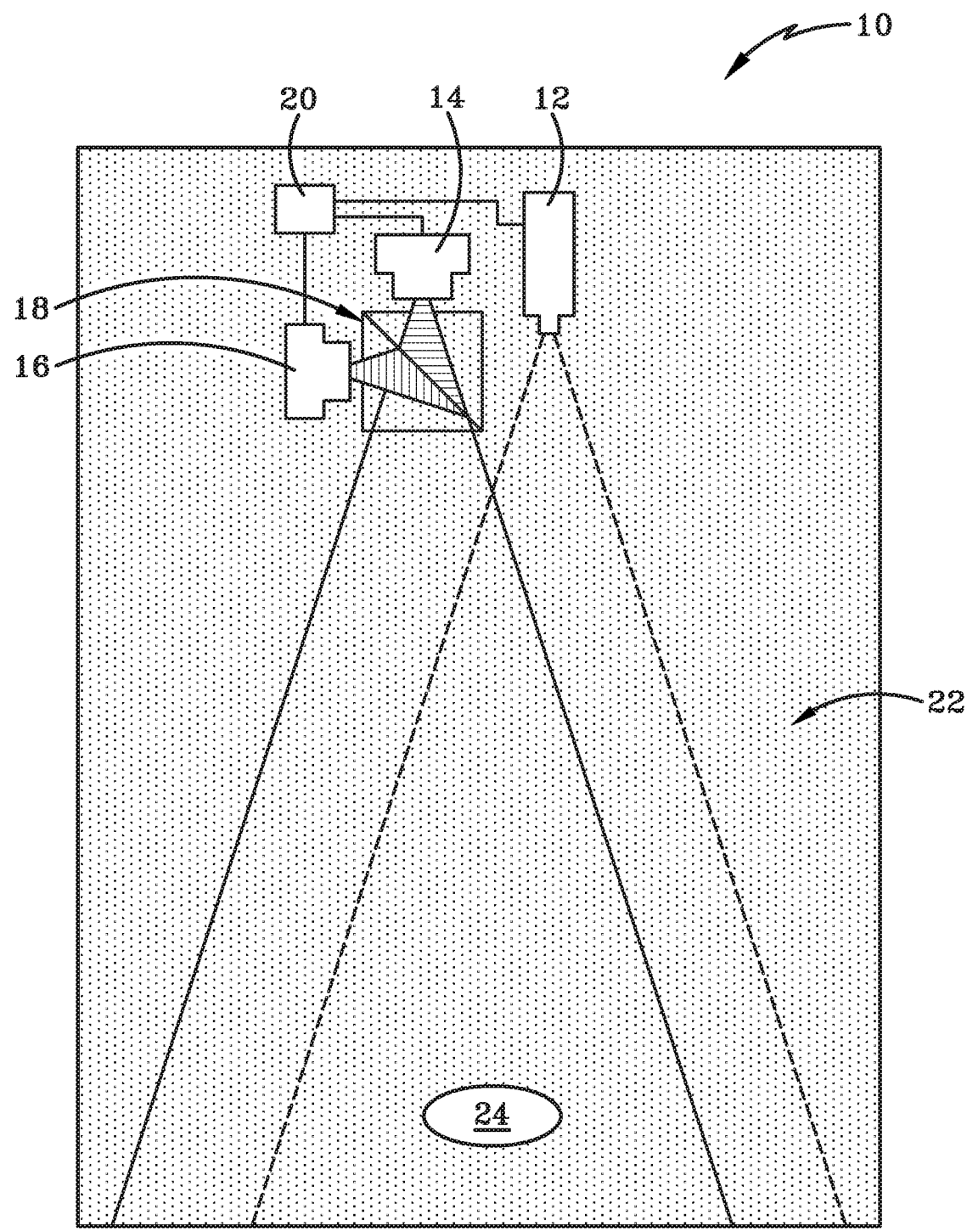
FIG. 1 is an exemplary dual-polarization range-gated LIDAR system in accordance with one aspect of the present disclosure.

FIG. 1 depicts a system for polarimetric ranging to an object embedded in a light-scattering medium generally at 10. The system 10 includes a polarized light source 12, a first range-gated imager 14, a second range-gated imager 16, a polarizing beam-splitter 18, and at least one processor for 20 for executing various instructions as more fully described below. In one particular embodiment, the polarized light source 12 directs polarized light downwardly within a light-scattering medium 22, which may also be referred to as medium, such as the ocean or seawater, to detect any object 24 that is located within the medium 22, including within the sub-bottom of the medium 22 (i.e., below the bottom of the medium 22). In one example, the system 10 may be considered a LIDAR polarimetry system 10 that provides three-dimensional (3D) shape estimation. Notably, a LIDAR system incorporates a light amplification by stimulated emission of radiation (LASER) with beam-projector optics, as well as one or more imagers, receivers, or cameras, as well as electronics and software to coordinate the lasers and imagers to capture images.

As shown in FIG. 1, the polarized light source 12, which may be a polarized laser, illuminates the scene, which is viewed by the first range-gated imager 14 and the second range-gated imager 16, both of which may be LIDAR imagers. In this example, identical fields of view are provided by having the first and second range-gated imagers 14, 16 view the scene through the polarizing beam splitter 18. Alternatively, the system 10 could use a non-polarizing beam splitter, with polarization selectivity provided by polarizing filters on the first and second range-gated imagers 14, 16. In one example, the polarizations are arranged to be aligned with (i.e. co-polarized (CoPol) with the polarized light source 12), or opposite (i.e., cross-polarized (XrPol) with the polarized light source 12). Other designs may provide additional polarizations, such as 45 degrees or 135 degrees relative to the polarized light source 12. Many other designs providing the same functionality are possible. An exemplary embodiment provides a capability to independently range-gate each of the various polarizations as more fully described below.

Although not illustrated, it is to be understood that the system 10 can be carried by a platform, such as a stationary or moveable platform. Some exemplary moveable platforms include either manned or unmanned vehicles, such as a vessel that travels through the medium 22 or an autonomous underwater vehicle (AUV). However, it is to be understood that the moveable platform does not need to be an underwater platform. For example, the moveable platform may be an airborne vehicle, such as, for example, a helicopter, a plane, or any other airborne vehicle either manned or unmanned.

The system 10 may include electronic circuitry to effectuate the generation of polarized light 26 (FIG. 1) from the polarized light source 12 in order to survey the medium 22 volume around the system 10 by illuminating the medium 22 volume around the system 10. The polarized light 26 depolarizes at a finite rate as it moves through the medium 22. Backscatter interference tends to preserve polarization, so that a polarized beam backscattered from the medium 22 is still polarized. For seawater, the depolarization rate is relatively slow, typically resulting in a decay of a completely polarized beam to 1/e polarization after approximately 7.5 scattering lengths. In clear ocean water, 7.5 scattering lengths can be 100 feet or more. This slow depolarization rate is not widely known, since it requires specialized equipment to measure. The depolarization rate is likely to be at least as long for circularly polarized light and elliptically polarized light as for linearly polarized light. The ocean bottom and many other objects depolarize the reflected light upon reflection. The depolarized reflections from the objects of interest and the sea bottom provide a means for discriminating objects of interest from water backscatter. Glints from surface returns are co-polarized with the laser. Thus, polarization of reflected light can also be used to separate glints from objects of interest. Additional polarization information can be obtained with additional imagers or photodetectors at different polarizations, such as +/−45 degrees. The polarized light source 12 may also be circularly polarized, with the first and second range-gated imagers 14, 16 circularly polarized opposite each other, and elliptically polarized, with the first and second range-gated imagers 14, 16 elliptically polarized opposite each other. Although particular polarizations of the polarized light source 12 and the first and second range-gated images 14, 16 have been described, it is to be understood that any suitable polarizations may be utilized.

The first range-gated imager 14 and the second range-gated imager 16 read and record the signal beam being returned to the system 10. In one exemplary implementation, the first range-gated imager 14 and the second range-gated imager 16 may be solid state detectors, such as silicon avalanche photo diodes (APDs). In another exemplary implementation, the first range-gated imager 14 and the second range-gated imager 16 may be photo multiplier tubes (PMTs) or streak-tubes; however, first range-gated imager 14 and the second range-gated imager 16 may be any suitable imager or photodetector. Regardless of the type of imager implemented, it is typically polarized relative to the polarized light generated by the polarized light source 12. In one particular embodiment, the first range-gated imager 14 and the second range-gated imager 16 are one of co-polarized (CoPol) and cross-polarized (XrPol) relative to each other or the polarized light source 12. The system 10 of the present disclosure measures the depolarization rate of the polarized light 26 in the medium 22. Previous teachings and expectations would have believed that multiple scattering in the medium 22 would depolarize the polarized light within about a few (e.g., one to three) scattering lengths such that deep targets or deep-water objects would appear the same in both co-polarized (CoPol) and cross-polarized (XrPol) images. However, the depolarization rate sensed by the first range-gated imager 14 and the second range-gated imager 16 relative to the polarized light 26 generated by the polarized light source 12 is much slower than originally expected. It has been empirically determined that a depolarization length is achieved by the structural configuration of system 10 that is equal to about 7.5 scattering lengths, which is typically about 80 feet in seawater. This achievement provided unexpected results based on the structure of system 10. Reflections from the bottom or ocean floor empirically behaved as expected and the ocean floor depolarizes the polarized light 26 almost completely.

Because objects 24 in the water column or medium 22 column depolarize the reflected light while backscatter from the medium 22 itself preserves polarization, the contrast of the objects 24 versus the water background is very high, even at low signal levels. This greatly increases the signal to noise and clutter ratio (SNCR) for detecting and classifying objects 24. Accordingly, a sensor may be coupled with the light generator (i.e., the polarized light source 12) carried by a platform traveling within the medium 22, wherein the light generator generates light (i.e., the polarized light 26) directed within the medium 22. The sensor is coupled with scatter detection logic to sense scatter in the light moving through the medium 22. Additionally, object detection logic may be coupled with the scatter detection logic to determine whether the object 24 is present in the medium 22 based, at least in part, on the scatter in the light moving through the fluid.

With continued reference to FIG. 1, system 10 characterizes the depolarization rate of the fluid. This requires a highly-polarized light source (i.e., the polarized light source 12) and the first range-gated imager 14 and the second range-gated imager 16, at least one of which is co-polarized (CoPol) with the polarized light source 12 and at least one of which is oppositely-polarized versus the polarized light source 12. For water characterization, the first range-gated imager 14 and the second range-gated imager 16 are aligned to have overlapping, and, in some instances identical, fields of view. The extinction ratios of orthogonal polarization directions, and the dynamic ranges of the first range-gated imager 14 and the second range-gated imager 16, must be sufficient to discriminate small polarizations of backscattered light. The first range-gated imager 14 and the second range-gated imager 16 are also gated or time-resolved, so that LIDAR-return intensity versus range can be measured for the first and second range-gated imagers 14, 16. The medium 22 is characterized by collecting intensity-versus range in the first and second range-gated imagers 14, 16, and computing from their ratios or differences (a) the depolarization rate of the medium 22 versus time or distance, (b) the overall attenuation rate of light in the medium 22 versus time or distance, and (c) the presence and depolarization properties of a bottom, such as the sea bottom, (if present).

System 10 uses the data from the characterization to set polarized-LIDAR range-gated imager parameters (e.g., time delays, integration times, gains, etc.) so as to optimally measure the reflections of water, the sea bottom, and of any objects 24 intervening between the polarized light and the bottom. An object 24 will appear more cross-polarized (XrPol) than the water compared to the water backscatter. The object 24 will also typically appear less cross-polarized (XrPol) compared to the sea bottom 24.

The discrimination of objects of interest versus the natural background can be done with both polarized range-gated imagers set to the same depths/ranges, or with them set to different depths/ranges. Detection of objects 24 versus the water backscatter can also be accomplished with just one range-gated imager polarized oppositely versus the transmitted beam, though the use of two or more range-gated imagers with distinct polarizations is sometimes preferred.

3D Imaging: Time-of-Flight (ToF) Methods

Time-of-flight (ToF) imaging is a method for estimating ranges to objects, or ranges to a multiplicity of points on a single object, by reflecting a pulse of light from the objects, or object, and measuring the reflected intensity with a time-resolved or temporally-gated imaging receiver. By controlling the transmitted-light pulse shape and duration, and the receiver gate start and stop times, a precise estimate of range-to-object can be determined for each point in the image.

Time-of-flight methods use temporally modulated light sources, and generate depth perception by sensing the time difference between the transmission and reception of light. There are various techniques for accomplishing ToF imaging, which can be generally categorized as direct or indirect ToF methods.

A direct method for ToF imaging includes operating a pulsed laser with a time-resolved receiver, such as in a 3D Flash LIDAR. Range is determined from the round-trip time from the transmission of the laser pulse to the receipt of the reflected light. One drawback of attempting to use a direct method for ToF imaging for 3D shape determination is the precision to which the time can be measured. For example, achieving 6.5 mm range resolution typically requires a time resolution of eleven picoseconds (a bandwidth of forty-six gigahertz (GHz)). This bandwidth is orders of magnitude higher than current 3D Flash LIDAR systems.

Another direct method for ToF imaging includes utilizing a point-cloud LIDAR, which is sometimes accomplished with Geiger-mode avalanche receivers. Each look direction in a point-cloud LIDAR retains only the first return that exceeds a set threshold. By scanning a single pixel, or a few pixels, around a scene, a 3D image is developed with one range data point per pixel. However, utilizing this direct ToF method in a translucent scattering medium is problematic due to the ubiquitous light backscatter, which reflects light from all ranges up to the solid object of interest. The brightest return is likely to be from the near-field backscatter, rather than from a hard object along the line of sight. Discriminating real targets from ambient backscatter requires collecting many shots (e.g., hundreds to thousands) per pixel, analyzing the statistics of the return times to separate backscatter artifacts from embedded hard objects, and localizing those objects in range. Using range-gating to reject very early and very late returns reduces the clutter that must be processed, but does not relieve the number-of-shots requirements. This turns a megapixel per image data rate into a rate orders of magnitude higher, and imposes significant real-time processing burdens on the system.

3D Imaging: Indirect ToF Methods and LIDAR

Indirect ToF methods work by encoding time/range as intensity variations recorded in pairs of two-dimensional (2D) camera images. One exemplary system and method in accordance with the present disclosure is an indirect ToF method that allows measuring the shapes of objects. Because the system and method are implemented with range-gated intensified imagers, large image-array sizes, (i.e., on the order of megapixels per image), provide detailed information on the 3D shape of objects. Range maps produced by the system and method are insensitive to non-uniform target reflectance and inhomogeneity of the illumination source (though very dark objects yield noisy range images). The indirect ToF systems and methods of the present disclosure are improved in a light-scattering medium by exploiting polarization. This is an improvement on conventional indirect ToF systems and methods, which do not include measures to mitigate effects of backscatter interference (BSI) on shape determination, and do not employ polarization. This is novel at least because forward scattering normally reduces the precision of 3D imaging. Exploitation of the de-polarizing properties of forward scattering is a novel and unobvious system and method to mitigate the scattering-mediated range 3D shape blur in ToF imaging as more fully described herein.

In one aspect according to the present disclosure, the systems and methods of the present disclosure employ a range-gated LIDAR system, which registers all pixels simultaneously, thereby reducing image distortion, reducing software complexity, and efficiently using laser energy. One of the novel aspects of the present disclosure is the use of polarization to exploit forward scattering in the light-scattering medium to mitigate BSI. The systems and methods of the present disclosure collect fine-resolution in all three spatial dimensions without requiring high speed temporal sampling (i.e., GHz or faster), and compute distances from pairs of range-gated LIDAR returns collected with gates wider than the desired range resolution, such, as for example, gates wider by a factor of one hundred or more in laboratory demonstrations. Despite the thickness of the range gates, precise range resolution is achieved by exploiting the temporal shape of the gate, (i.e., the way the gates ramp up and down as the imager is turned on and off) using the nonlinear slope r(t) of the up-ramps and down-ramps of the gain curve as more fully described below. A pair of images collected to place the object at different places on the up-ramps and down-ramps is processed to separate reflectance from range and render an image of ranges to object across the entire image. As such, the systems and methods of the present disclosure provide a range resolution that is much finer than is possible with conventional range-gated LIDAR systems, the resolution of which is determined by the gate width. For example, if the conventional LIDAR gate is five feet thick, the objects can be localized to within five feet of range. However, if the systems and methods of the present disclosure utilize five-foot gates, with the gates being ramped, the range resolution is five millimeters (0.2 inches).

Polarimetric Imaging in a Light-Scattering Medium

The basic mathematics of range-from-polarization computation are described as follows: The LIDAR impulse-response background returns ($R_{Bgd,Co}$ for co-polarized and $R_{Bgd,Xr}$ for cross-polarized) from the scattering medium and an opaque boundary (such as the bottom of an ocean) are:

$$R_{Bgd,Co}(z) = \qquad \text{Equation (1)}$$

$$I_{Transmitted} \times \begin{bmatrix} \rho_W(z)\exp(-2Kz)D_{Co}(z)\Theta(z_{Bott} - z) + \\ \rho_{Bott}\exp(-2Kz_{Bott})D_{Co}(z_{Bott})\delta(z_{Bott} - z) \end{bmatrix},$$

with $$D_{Co}(z) = \frac{1}{2}[1 + \exp(-2d_{Pol}b_F z)] \qquad \text{Equation (2)}$$

for the co-polarized background return, and:

$$R_{Bgd,Xr}(z) = \qquad \text{Equation (3)}$$

$$I_{Transmitted} \times \begin{bmatrix} \rho_W(z)\exp(-2Kz)D_{Xr}(z)\Theta(z_{Bott} - z) + \\ \rho_{Bott}\exp(-2Kz_{Bott})D_{Xr}(z_{Bott})\delta(z_{Bott} - z) \end{bmatrix},$$

with $$D_{Xr}(z) = \frac{1}{2}[1 - \exp(-2d_{Pol}b_F z)] \qquad \text{Equation (4)}$$

for the cross-polarized background return. The range z is to be understood as a propagation distance in the light-scattering medium 22 of interest, and is not necessarily in the vertical direction. For example, the range z may be horizontal or at an incline for a vehicle-borne LIDAR system. Likewise, the range to an opaque boundary $z_{Bott}$ may be the range to the ground or bottom, the range to a vertical boundary such as a wall or cliff, or any other opaque boundary.

Figure 2:
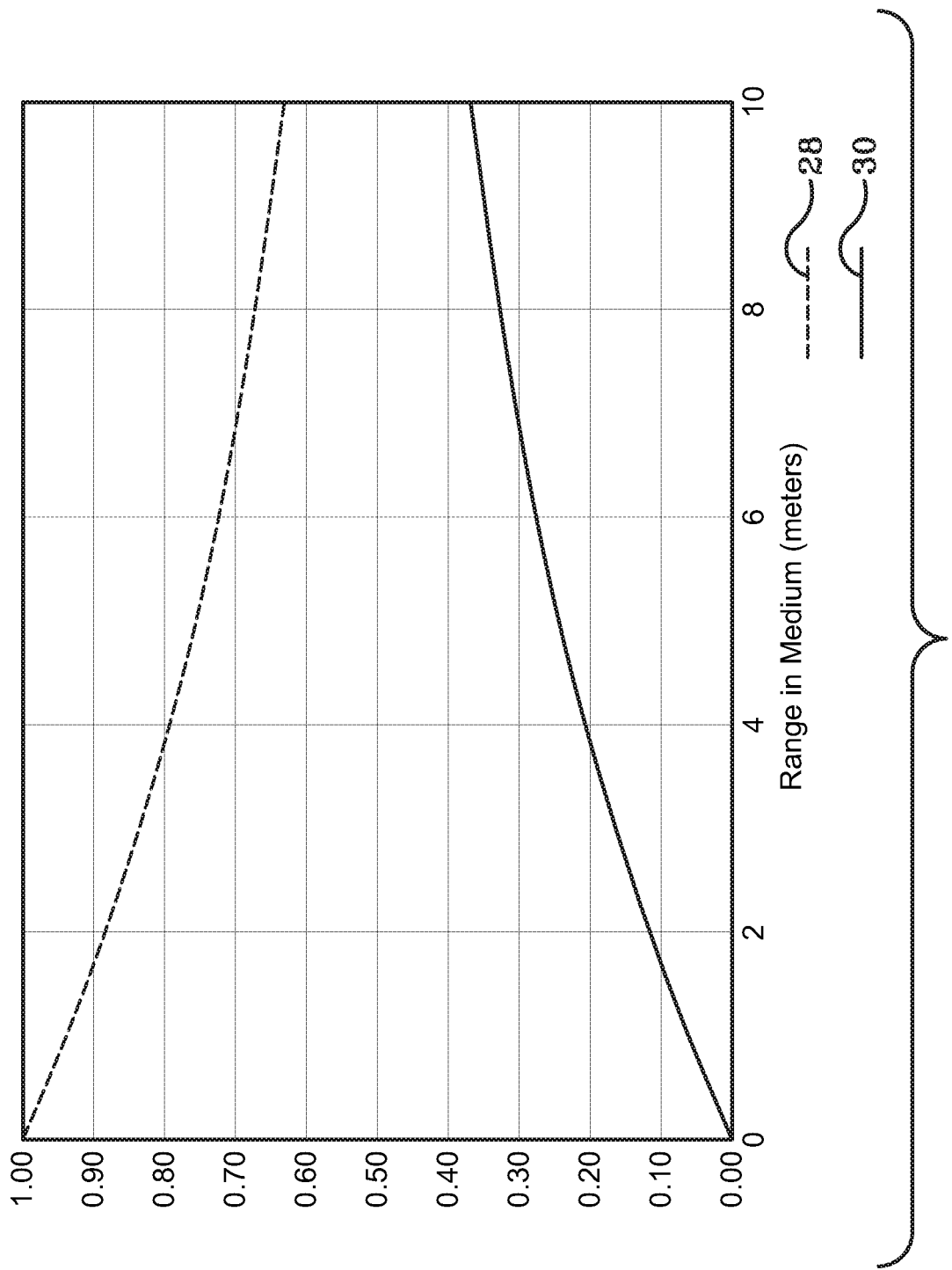
FIG. 2 depicts exemplary scattering-mediated depolarization functions.

The quantity $\rho_W$ is the backscatter reflectance per unit distance light travels in the medium, $b_F$ is the forward-scattering coefficient, $d_{Pol}$ is the depolarization factor, and K is the attenuation coefficient of the medium for the LIDAR system. The differences between $D_{Co}$ and $D_{Xr}$ are exploitable for ranging, because they have different slopes with increasing range. This is illustrated in FIG. 2 for an exemplary case of moderately-turbid ocean water. More particularly, FIG. 2 depicts exemplary scattering-mediated depolarization functions from Equations (2) and (4) for a moderately turbid ocean with K=0.15/m, $b_F$=0.5/m and $d_{Pol}$=0.14. The co-polarized function $D_{Co}$, indicated as 28, has a negative slope, while the cross-polarized function $D_{Xr}$, indicated as 30, has a positive slope. Other media may have different parameters, but $D_{Co}$ and $D_{Xr}$ will retain opposite slopes versus range. The water-turbidity parameters K and $b_F$ will have different values at various locations and times of year, however, the depolarization parameter $d_{Pol}$ will generally be near 0.14 over a wide range of water clarities.

The medium reflectance-per-unit-range $\rho_W$ depends on the turbidity of the medium, and may also depend on range z in optically-stratified media. In Equation (1) and Equation (3), the opaque-boundary is assumed to be de-polarizing (a typical condition), so that the reflectance $\rho_{Bott}$ is equal for both polarization directions. For boundaries which have partially-depolarizing reflectances, Equation (1) and Equation (3) would be modified to include separate reflectances for each polarization direction. The relative magnitudes of the co-polarized and cross-polarized reflectances can be determined empirically from LIDAR returns straddling or stepping through the boundary. The intensity of the beam at range z=0 is given by $I_{Transmitted}$. As the light propagates in the medium, it is attenuated exponentially with a decay constant K, so that the two-way attenuation is exp(−2Kz). In addition to attenuation, the medium also scatters the propagating light. Via multiple forward scatterings, an initially polarized beam is depolarized, so that the degree of polarization (DOP) decays exponentially with decay constant $d_{Pol} \times b_F$, where $b_F$ is the forward-scattering coefficient of the medium, and $d_{Pol}$ is the depolarization rate constant. For seawater, the value of $d_{Pol}$ is approximately 0.14. Other scattering media may have different values for $d_{Pol}$, which can be determined empirically by measuring the DOP versus range in the medium.

The total background impulse-response return $R_{Bgd,T}$ (co-polarized plus cross-polarized) is proportional to the sum of water and background reflectances weighted by the exponential attenuation:

$$R_{Bgd,T}(z)/I_{Transmitted} = R_{Bgd,Co}(z) + R_{Bgd,Xr}(z) = [\rho_W(z)\exp(-2Kz)\Theta(z_{Bott}-z) + \rho_{Bott}\exp(-2Kz_{Bott})\delta(z_{Bott}-z)] \qquad \text{Equation (5)}.$$

An object embedded in the medium contributes positive reflection signal and negative shadow signals to the LIDAR returns according to:

$$R_{Obj,Co} / I_{Transmitted} \approx \qquad \text{Equation (6)}$$

$$\begin{bmatrix} \rho_{Obj}D_{Co}(z_{Obj})\delta(z_{Obj} - z) - \\ \rho_M(z)D_{Co}(z)\Theta(z - z_{Obj})\Theta(z_{Bott} - z) - \\ \rho_{Bott}D_{Co}(z_{Bott})\delta(z - z_{Bott}) \end{bmatrix} C_{Obj}(z)\exp(-2Kz).$$

Likewise, the XrPol LIDAR return is:

$$R_{Obj,Xr} / I_{Transmitted} \approx \qquad \text{Equation (7)}$$

$$\begin{bmatrix} \rho_{Obj}D_r(z_{Obj})\delta(z_{Obj} - z) - \\ \rho_W(z)D_r(z)\Theta(z - z_{Obj})\Theta(z_{Bott} - z) - \\ \rho_{Bott}D_e(z_{Bott})\delta(z - z_{Bott}) \end{bmatrix} C_{Obj}(z)\exp(-2Kz).$$

The step function $\Theta(z)$ is given by:

$$\Theta(z) = \begin{cases} 1, & z \geq 0 \\ 0, & z < 0 \end{cases}. \qquad \text{Equation (8)}$$

$C_{Obj}(z)$, which is in the range between zero and one, is a blur-induced contrast reduction factor, which depends on object size and the scattering properties of the medium. $C_{Obj}(z)$ can be determined empirically from LIDAR data, or it can be modeled from first principles. As with the opaque-boundary reflectance, the object reflectance will commonly be independent of polarization, so that $$R_{Obj,Xr}(z) = R_{Obj,Co}(z) \qquad \text{Equation (9)}.$$

In cases in which the object does not completely depolarize the reflected light, separate reflectance for co-polarization and cross-polarization would be used in place of $\rho_{Obj}$.

Range-Gated Polarized Imaging

The systems and methods of the present disclosure illustrate the basic physics and essential principles of polarimetric ranging. More-complete theoretical approximations are also available, via numerical simulations. Generally, a range-gated LIDAR image is produced when an imaging LIDAR system is set to accept photons from a finite span of time delays. The time delays are typically measured relative to the time of the peak light-transmission of the illuminating laser. For standard range-gating, the imagers are turned on at a time delay $t_1$, which corresponds to a range $z_1$, and turned off at a time $t_2$ which corresponds to a range $z_2$, with an imager response and gain held as uniform as possible over the time interval. The total LIDAR returns in the co-polarized and cross-polarized channels are the sum of the background and object returns, integrated over the range gate. For the case of objects suspended in the medium, with a range gate that does not straddle the boundary, the total returns are:

$$R_{Co}(z_{Obj}) = G \times \int_{z_t}^{z_2} dz [R_{Bgd,Co}(z) + R_{Obj,Co}(z)] \quad \text{Equation (10)}$$

$$= G \times I_{Transmitted} \times \int_{z_t}^{z_2} dz \exp(-2Kz)$$

$$\left\{ \begin{array}{c} \rho_w(z) D_{Co}(z)[1 - \Theta(z - z_{Obj})C_{Obj}(z)] + \\ \rho_{Obj} D_{Co}(z_{Obj})\delta(z_{Obj} - z)C_{Obj}(z) \end{array} \right\}$$

and $$R_{Xr}(z_{Obj}) = G \times I_{Transmitted} \times \quad \text{Equation (11)}$$

$$\int_{z_1}^{z_2} dz \exp(-2Kz) \left\{ \begin{array}{c} \rho_M(z) D_{Xr}(z)[1 - \Theta(z - z_{Obj})C_{Obj}(z)] + \\ \rho_{Obj} D_{Xr}(z_{Obj})\delta(z_{Obj} - z)C_{Obj}(z) \end{array} \right\}$$

In Equation (10) and Equation (11), the gain G is assumed to be constant over the gate time. In real gated imagers, the gain will ramp up at the start, remain steady for an operator-specified time, and then ramp down at the end of the gate. In conventional range-gated LIDAR, the ramp-up and ramp-down are designed to be as fast as possible, and any gain variation over time is considered a nuisance to be minimized. Given identical gate durations between the CoPol and XrPol channels, the DOP is then given by:

$$DOP(z_{Obj}) = \frac{[R_{co}(z_{Obj}) - R_{Xr}(z_{Obj})]}{[R_{co}(z_{Obj}) + R_{Xr}(z_{Obj})]}, \quad \text{Equation (12)}$$

where $$[R_{Co}(z_{Obj}) - R_{Xr}(z_{Obj})] \approx G \times I_{Transmitted} \times \quad \text{Equation (13)}$$

$$\left[ \begin{array}{c} \int_{z_1}^{z_2} \rho_w dx \exp(-2Kz) \rho_w(z) \exp(-2d_{Pol}b_f z)[1 - \\ \Theta(z - z_{Obj})C_{Obj}(z)] + \rho_{Obj} \exp(-2d_{Pol}b_F z_{Obj})C_{Obj}(z) \end{array} \right],$$

and $$[R_{Co}(z_{Obj}) + R_{Xr}(z_{Obj})] \approx G \times I_{Transmitted} \times \quad \text{Equation (14)}$$

$$\left\{ \int_{z_1}^{z_2} dz \exp(-2Kz) \rho_w(z)[1 - \Theta(z - z_{Obj})C_{Obj}(z)] + \rho_{Obj} C_{Obj}(z_{Obj}) \right\}.$$

Equation (12) gives a relationship between the DOP and the range to object, bounded by the starting and ending ranges $z_1$ and $z_2$. Thus, it gives a more-precise range to target than a conventional gated LIDAR, which could only show that the object is somewhere in the gate. In principle, the DOP-vs-range curve could be used to also compute a range to each pixel in the image, yielding a three-dimensional (3D) shape estimate. In practice, using DOP alone can yield a fuzzy shape, due to the relatively small slopes of the $D_{Xr}$ and $D_{Co}$ curves, which give small changes in DOP over centimeter-scale differences in range across a typical object of interest. More precision can be obtained by manipulating the intra-gate responses of the polarization channels, as well as by manipulating the width of the polarized-laser pulse used to illuminate objects through the scattering medium.

In accordance with one aspect of the present disclosure, the sensitivity of DOP-based ranging can be increased by deliberately varying the gains over the gate duration, so as to amplify the sensitivity-versus-range trends provided by the de-polarizing effects of the scattering medium.

A basic model of gain-modulated polarized LIDAR returns is given by integrating the gain-weighted impulse responses over the durations of the CoPol and XrPol gates. With an exemplary linear-gain function, the CoPol channel yields:

$$R_{Co}(z_{Obj}) = I_{Transmitted} \times \int_{z_1}^{z_2} dz \quad \text{Equation (15)}$$

$$\exp(-2Kz) G_{Co}(z) \left\{ \begin{array}{c} \rho_w(z) D_{Co}(z)[1 - \\ \Theta(z - z_{Obj})C_{Obj}(z)] + \\ \rho_{Obj} D_{Co}(z_{Obj})\delta(z_{Obj} - z)C_{Obj}(z) \end{array} \right\},$$

with:

$$G_{Co}(z) = G_{Co,start} + s_{Co}(z - z_{1,Co}) \quad \text{Equation (16)}$$

and $$s_{Co} = \frac{(G_{Co,end} - G_{Co,start})}{(z_{2,Co} - z_{1,Co})}. \quad \text{Equation (17)}$$

Likewise, for the XrPol channel, $$R_{Xr}(z_{Obj}) = I_{Transmitted} \times \int_{z_1}^{z_2} dz \exp(-2Kz) G_{Xr}(z) \quad \text{Equation (18)}$$

$$\left\{ \begin{array}{c} \rho_W(z) D_{Xr}(z)[1 - \Theta(z - z_{Obj}) C_{Obj}(z)] + \\ \rho_{Obj} \delta(z_{Obj} - z) C_{Obj}(z) \end{array} \right\},$$

with:

$$G_{Xr}(z) = G_{Xr,start} + s_{Xr}(z - z_{1,Xr}) \quad \text{Equation (19)}$$

and $$s_{Xr} = \frac{(G_{Xr,end} - G_{Xr,start})}{(z_{2,Xr} - z_{1,Xr})}. \quad \text{Equation (20)}$$

For the CoPol channel, a negative value for the gain slope $s_{Co}$ will amplify the decrease of signal with depth shown in FIG. 2, and for the XrPol channel, a positive slope amplifies the relative increase of signal level with range in accordance with the following equations:

$$R_{Co}(z_{Obj}) = I_{Transmitted} \times \quad \text{Equation (21)}$$

$$\left\{ \begin{array}{l} \int_{z_{1,Co}}^{z_{2,Co}} dz \exp(-2Kz) G_{Co}(z) \rho_W(z) D_{Co}(z) C_{Obj}(z), \; z_{Obj} < z_{1,Co} \\ \left[ \begin{array}{l} \exp(-2Kz_{Obj}) G_{Co}(z_{Obj}) \rho_{Obj} C_{Obj}(z_{Obj}) + \\ \int_{z_{1,Co}}^{z_{Obj}} dz \exp(-2Kz) G_{Co}(z) \rho_W(z) D_{Co}(z) C_{Obj}(z) \end{array} \right], \\ z_{1,Co} < z_{Obj} < z_{2,Co} \\ 0, \; z_{Obj} > z_{2,Co} \end{array} \right.$$

and $$R_{Xr}(z_{Obj}) = I_{Transmitted} \times \quad \text{Equation (22)}$$

$$\left\{ \begin{array}{l} \int_{z_{1,Xr}}^{z_{2,Co}} dz \exp(-2Kz) G_{Xr}(z) \rho_W(z) D_{Xr}(z) C_{Obj}(z), \; z_{Obj} < z_{1,Xr} \\ \left[ \begin{array}{l} \exp(-2Kz_{Obj}) G_{Xr}(z_{Obj}) \rho_{Obj} C_{Obj}(z_{Obj}) + \\ \int_{z_{1,Xr}}^{z_{Obj}} dz \exp(-2Kz) G_{Xr}(z) \rho_W(z) D_{Xr}(z) C_{Obj}(z) \end{array} \right], \\ z_{1,Xr} < z_{Obj} < z_{2,Xr} \\ 0, \; z_{Obj} > z_{2,Xr} \end{array} \right.$$

For the case in which the gates are chosen to have the start and end times set equal, so that $z_{1,Xr} = z_{1,Co} = z_1$ and $z_{2,Xr} = z_{2,Co} = z_2$; and for a completely de-polarizing target within the gate, the gain-enhanced DOP is given by:

$$DOP(z_{Obj}) = \frac{[R_{Co}(z_{Obj}) - R_{Xr}(z_{Obj})]}{[R_{Co}(z_{Obj}) + R_{Xr}(z_{Obj})]} \approx \quad \text{Equation (23)}$$

$$\frac{\left[ \begin{array}{l} \rho_{Obj}(G_{Co}(z_{Obj}) - G_{Xr}(z_{Obj})) + \\ \int_{z_1}^{z_{Obj}} dz \exp(-2K(z - z_{Obj})) \rho_W(z)(G_{Co}(z) D_{Co}(z) - G_{Xr}(z) D_{Xr}(z)) \end{array} \right]}{\left[ \begin{array}{l} \rho_{Obj}(G_{Co}(z_{Obj}) - G_{Xr}(z_{Obj})) + \\ \int_{z_1}^{z_{Obj}} dz \exp(-2K(z - z_{Obj})) \rho_W(z)(G_{Co}(z) D_{Co}(z) - G_{Xr}(z) D_{Xr}(z)) \end{array} \right]}$$

In Equation (23), the forward-scattering contrast-reduction factor $C_{Obj}(z)$ has been assumed to vary little between object reflections (the terms proportional to $\rho_{Obj}$ and partially-shadowed water reflection (the terms proportional to $\rho_W$) modes, so that $C_{Obj}(z) \approx C_{Obj}(z_{Obj})$ in the range gate. For extremely clear water ($\rho_W \ll \rho_{Obj}$), and short laser gates, Equation (23) further reduces to:

$$DOP(z_{Obj}) \approx \frac{[G_{Co}(z_{Obj}) - G_{Xr}(z_{Obj})]}{[G_{Co}(z_{Obj}) + G_{Xr}(z_{Obj})]}. \quad \text{Equation (24)}$$

One important aspect of Equation (24) is that the relationship between DOP and $z_{Obj}$ is insensitive to the intensity of the illuminator, or to the absolute reflectance of the object of interest, so that when the medium BSI is small, the shape of an object can be determined just from a lookup table, without first characterizing the BSI.

In accordance with one aspect of the present disclosure, the cases of interest are those in which the BSI is not negligible. In such cases, BSI reduces the contrast of the object versus the background, and reduces the contrast between polarization channels. In accordance with one exemplary implementation, first consider the case of gains set equal and constant (i.e., not slewed):

Equation (25)

$$DOP(z_{Obj}) \approx \frac{\left[ \begin{array}{l} \exp(-2Kz_{Obj}) \rho_{Obj}(G_{Co}(z_{Obj}) - G_{Xr}(z_{Obj})) + \\ \int_{z_1}^{z_{Obj}} dz \exp(-2Kz) \rho_W(z)(G_{Co}(z) D_{Co}(z) - G_{Xr}(z) D_{Xr}(z)) \end{array} \right]}{\left[ \begin{array}{l} \exp(-2Kz_{Obj}) \rho_{Obj}(G_{Co}(z_{Obj}) - G_{Xr}(z_{Obj})) + \\ \int_{z_1}^{z_{Obj}} dz \exp(-2Kz) \rho_W(z)(G_{Co}(z) D_{Co}(z) - G_{Xr}(z) D_{Xr}(z)) \end{array} \right]}$$

$$\approx \frac{\left[ \int_{z_1}^{z_{Obj}} dz \exp(-2Kz) \rho_W(z) \exp(-2d_{Pol} b_F z) \right]}{\left[ 2\exp(-2Kz_{Obj}) \rho_{Obj} + \int_{z_1}^{z_{Obj}} dz \exp(-2Kz) \rho_W(z) \right]}$$

-continued $$\approx \frac{(\exp(2(K + d_{Pol}b_F)(z_{Obj} - z_1)) - 1)}{\left[4K\frac{\rho_{Obj}}{\rho_W} + (\exp(2K(z_{Obj} - z_1)) - 1)\right]}$$

$$\exp(-2(d_{Pol}b_F)z_{Obj})$$

$$\approx \frac{(1 + d_{Pol}b_F/K)(z_{Obj} - z_1)}{\left[2\frac{\rho_{Obj}}{\rho_W} + (z_{Obj} - z_1)\right]} \exp(-2(d_{Pol}b_F)z_{Obj})$$

$$\approx (1 + d_{Pol}b_F/K)\frac{\rho_W}{2\rho_{obj}}(z_{Obj} - z_1)\exp(-2(d_{Pol}b_F)z_{Obj}).$$

Equation (25) shows that, if the gains are equal for all polarizations, and for the case of an object much more reflective than the medium, the DOP has a simple dependence on range to the object, and is gain-independent. Because the medium reflectance over a gate length $\rho_W(z_2-z_1)$ is typically lower than $\rho_{Obj}$, this provides a relatively small signal that is best exploited by averaging over an extended area of the object of interest. The sensitivity $\Delta z$ to a change $\Delta DOP$ in DOP can be estimated from:

$$\Delta DOP = [DOP(z + \Delta z) - DOP(z)] \qquad \text{Equation (26)}$$

$$\approx (1 + d_{Pol}b_F/K)\frac{\rho_W}{2\rho_{Obj}}$$

$$\left\{\begin{array}{l}\Delta z\exp(-2(d_{Pol}b_F)\Delta z) + \\ (z_1 - z)[1 - \exp(-2(d_{Pol}b_F)\Delta z)]\end{array}\right\}\exp(-2(d_{Pol}b_F)z)$$

$$\approx (1 + d_{Pol}b_F/K)\Delta z\exp(-2(d_{Pol}b_F)z),$$

so that for fine range discrimination (small $\Delta z$):

$$\Delta z \approx \frac{2\rho_{Obj}}{\rho_W}\frac{\Delta DOP}{(1 + d_{Pol}b_F/K)}\exp(+2(d_{Pol}b_F)z). \qquad \text{Equation (27)}$$

Because the factor $(2\rho_{Obj}/\rho_W)$ is typically much greater than one, fine discrimination of changes in DOP is required to achieve fine range resolution. In addition, due to the exponential factor in Equation (27), the required DOP precision becomes finer with increasing depth.

The systems and methods of the present disclosure increase the sensitivity of polarimetric ranging to make it more exploitable for 3D shape estimation. To increase range sensitivity, Equation (23) suggests two methods to deal with BSI:

1) vary or slew the gains of the first range-gated imager 14 and the second range-gated imager 16 so as to minimize the BSI effect on DOP, providing higher contrast versus the background; or 2) vary or slew the gains of the first range-gated imager and the second range-gated imager 16 so as to amplify the slope of the apparent DOP-versus range, providing greater sensitivity.

Method 1) is optimized if the gains can be slewed so that $$G_{Co}(z)D_{Co}(z) = G_{Xr}(z)D_{Xr}(z) = g \qquad \text{Equation (28),}$$

independent of z for all z such that $z_1 < z < z_2$. Then Equation (23) reduces to:

$$DOP(z_{Obj}) \approx \frac{[G_{Co}(z_{Obj}) - G_{Xr}(z_{Obj})]}{[(G_{Co}(z_{Obj}) + G_{Xr}(z_{Obj})) +} \approx \qquad \text{Equation (29)}$$

$$\frac{2g}{\exp(-2Kz_{Obj})\rho_{Obj}}\int_{z_1}^{z_{Obj}}dz\exp(-2Kz)\rho_W(z)\right]$$

$$\frac{[G_{Co}(z_{Obj}) - G_{Xr}(z_{Obj})]}{\left[(G_{Co}(z_{Obj}) + G_{Xr}(z_{Obj})) + \frac{g}{K}\frac{\rho_W}{\rho_{Obj}}(\exp(-2K(z_{Obj} - z_1)) - 1)\right]}.$$

In Equation (29), the medium reflectance has been taken to vary little with depth, a typical condition, to show clearly that water backscatter can be nearly eliminated by setting the gate-start depth $z_1$ to be close to the range to the nearest portion of the object. The range-to-DOP relationship then simplifies to:

$$DOP(z_{Obj}) \approx \frac{[G_{Co}(z_{Obj}) - G_{Xr}(z_{Obj})]}{\left[(G_{Co}(z_{Obj}) + G_{Xr}(z_{Obj})) - 2g\frac{\rho_W}{\rho_{Obj}}(z_{Obj} - z_1)\right]}, \qquad \text{Equation (30)}$$

which will give small corrections to the BSI-free Equation (24). By raising the gains of both channels, while assuring they meet the condition of Equation (28), the sensitivity of DOP to range can be increased, and the BSI further suppressed. The sensitivity of Equation (30) is determined by the depolarization rate of the medium. For target reflectances much greater than the water reflectance, $$DOP(z_{Obj}) \approx [D_{Xr}(z_{Obj})D_{Co}(z_{Obj})] \approx -\exp(-2d_{Pol}b_F z_{Obj}) \qquad \text{Equation (31).}$$

For 3D shape determination, the derivative of the DOP-versus range is:

$$\frac{\partial}{\partial z}DOP(z) \approx 2d_{Pol}b_F\exp(-2d_{Pol}b_F z), \qquad \text{Equation (32)}$$

so that the sensitivity $\Delta z$ to a change $\Delta DOP$ in DOP is:

$$\Delta z = \frac{\Delta DOP}{2d_{Pol}b_F}\exp(+2d_{Pol}b_F z). \qquad \text{Equation (33)}$$

Comparing Equation (33) to Equation (27) shows that slewing the gain to equalize the BSI measured in the different polarization channels improves the range sensitivity. This is because the factor $1/(2d_{Pol}b_F)$ is typically much smaller than the factor $(2\rho_{Obj}/\rho_W)$, so that smaller $\Delta DOP$ is required to achieve a given range resolution $\Delta z$.

If it is not possible to slew the gains precisely enough to cancel the BSI, or if the depolarization of the BSI is not known, other gain-slewing methods can be employed. For example, in method 2), the gains are slewed so as to exaggerate, rather than suppress, the polarization-versus-depth dependence. This produces a stronger, though more complicated DOP-versus-range relationship than Equation (31), since Equation (23) now retains all of the water-backscatter terms. The extra complexity is shown by an exemplary case, with the co-polarized gain falling linearly from an initial gain of Go at depth $z_1$ to zero at depth $z_2$, while the cross-polarized gain rises from zero at depth $z_1$ to Go at depth $z_2$, so that:

$$G_{Co}(z) = \begin{cases} 0, & \text{for } z < z_1 \text{ or } z > z_2 \\ \frac{(z_2 - z)}{(z_2 - z_1)} G_0, & \text{for } z_1 < z < z_2 \end{cases} \quad \text{Equation (34)}$$

and $$G_{Xr}(z) = \begin{cases} 0, & \text{for } z < z_1 \text{ or } z > z_2 \\ \frac{(z - z_1)}{(z_2 - z_1)} G_0, & \text{for } z_1 < z < z_2 \end{cases} \quad \text{Equation (35)}$$

Since the precision of ranging to pixels on the object depends on the net slope of the DOP-vs-range curve, Equation (34) and Equation (35) provide higher sensitivity than Equation (28), but at the expense of increasing the BSI accepted in the DOP. Thus, modeling via Equation (23), or a similar model, is typically needed to create the lookup-tables for accurate 3D shape determination. The model parameters K and $d_{pol}b_F$ can be determined from analyzing polarimetric LIDAR data obtained by stepping narrow gates through the water background to collect BSI data, and measuring relative intensities versus depth of CoPol and XrPol BSI. In addition to analytic models like Equation (23), optical simulations, such as Monte-Carlo simulations and ray-tracing methods, can be used to generate precise DOP versus range look up tables. If the slopes are monotonic, but not linear, the range is given by a look-up table relating delay time to DOP. As long as the responses are monotonic versus range, the processing to determine shape is extremely quick and efficient.

Laser Pulse Duration Matched to Imager Exposures

The methods described above typically require precise control of time-varying gain functions in one or more range-gated imagers, and typically utilize laser pulses that are much shorter than the gate durations. An alternate method is to allow the gain functions to be constant, or nearly constant, in the interval between gate turn-on and gate turn-off, and use laser pulses with durations similar to the duration of the gates. If the laser pulse has a finite duration with a spatial pulse shape P(z) having a full-width at half maximum $w_p$, then the LIDAR returns are given by convolving the impulse-responses from Equation (1), Equation (3), Equation (6), and Equation (7) with P(z) before applying the gains and gate responses.

Figure 3A:
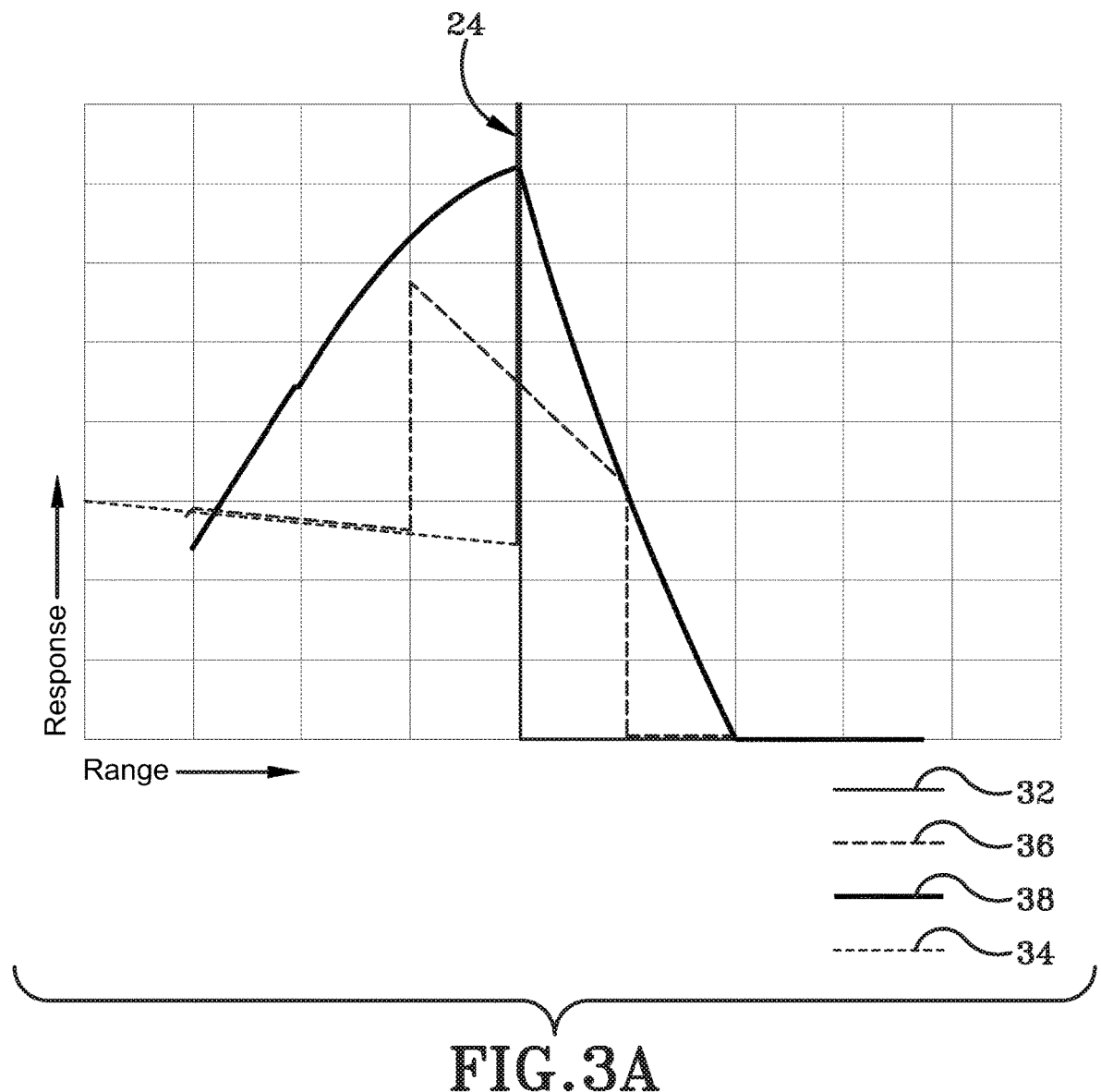
FIG. 3A is an exemplary imaging LIDAR response versus range curve where a laser pulse width of the polarized light equals the imager gate widths.
Figure 3B:
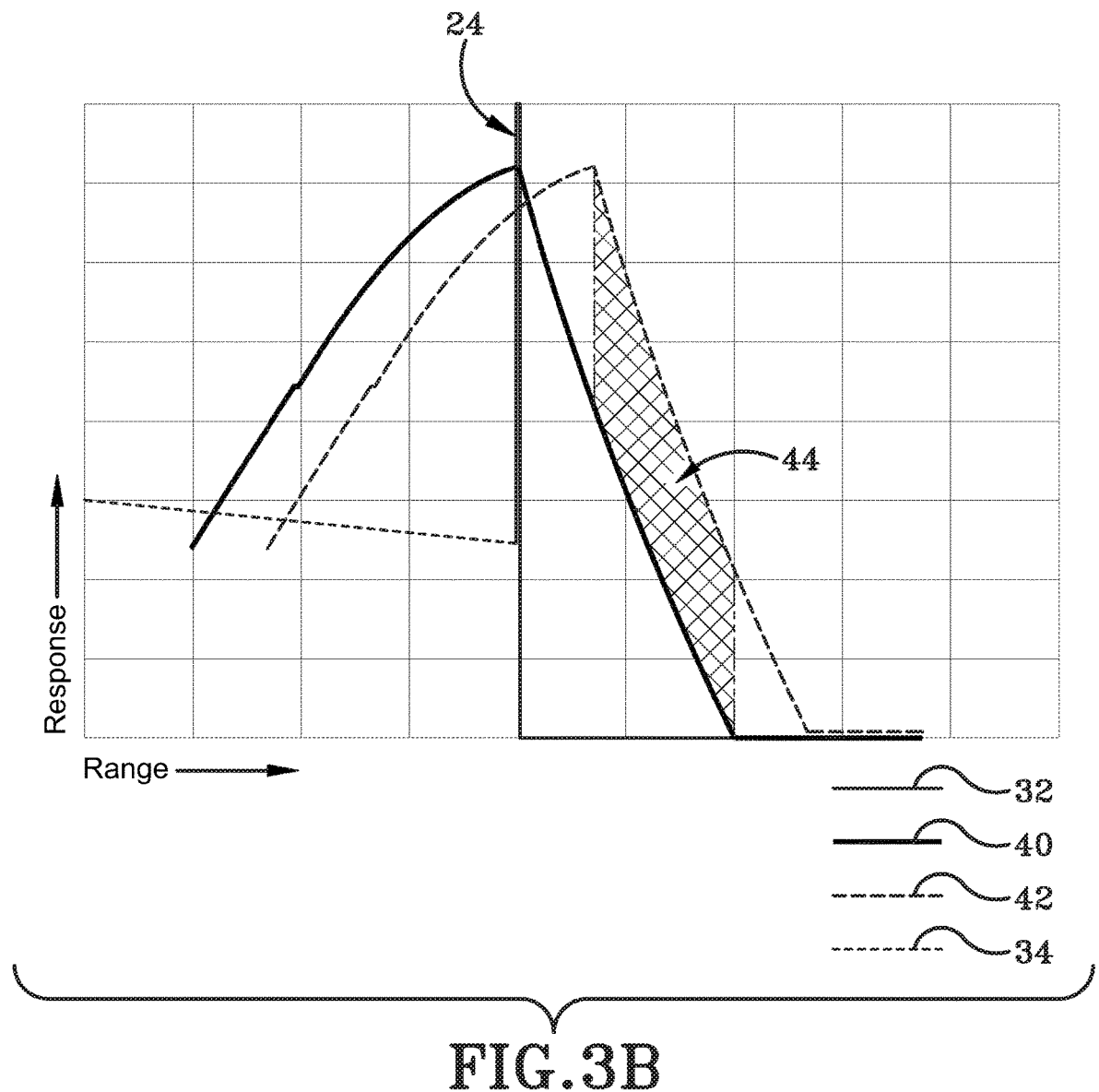
FIG. 3B is an exemplary imaging LIDAR response versus range curve where a laser pulse width of the polarized light equals the imager gate widths showing that a range to an object can be measured over a range of values defined by overlapping near-linear portions of the gated response.

FIG. 3A and FIG. 3B are exemplary imaging LIDAR response versus range curves where a laser pulse width of the polarized light equals the imager gate widths. FIG. 3A is a graph of LIDAR response on the y-axis versus range on the x-axis. More particularly, FIG. 3A depicts an ocean impulse response curve with water backscatter indicated at line 32, and reflection and shadow indicated at line 34 from an opaque object 24, a rectangular pulse convolved with the ocean impulse response curve indicated at line 36, and a rectangular pulse and rectangular imager gate convolved with the ocean impulse response curve indicated at line 38.

FIG. 3B is a graph of LIDAR response on the y-axis versus range on the x-axis. More particularly, FIG. 3B depicts the ocean impulse response curve with water backscatter indicated at line 32, and reflection and shadow indicated at line 34 from the opaque object 24, a gated LIDAR response from a first range-gated imager indicated at 40, and a gated LIDAR response from a second range-gated imager indicated at 42. As shown in FIG. 3B, and with two imager gates at different delays, a range to the object 24 can be measured over a range of values defined by overlapping near-linear portions of the gated response, indicated at 44. Longer gates allow measurement of more rugged objects, and shorter gates allow more range precision at a given power. On the time-late (more shadowed) side of the object 24, the gates are insensitive to BSI and the LIDAR responses are monotonic versus gate-object separation.

With rectangular LIDAR range gates, the net LIDAR return is a combination of water backscatter and target reflection. The target reflection portion depends linearly on the distance from the gate start to the object location. By capturing two gated images at different gate-start times, the common-mode intensities can be ratioed out, leaving a quantity that depends monotonically on range to target. Although rectangular LIDAR range gates have been described, is to be understood that any suitable LIDAR range gate can be utilized.

Signal Level Requirements

The LIDAR returns can be convolved with a laser-pulse shape function P(z) as more fully described below. The background LIDAR returns away from the scattering-medium boundary are:

$$R_{Bgd,Co}(z)/I_{Transmitted} = \int dz' P(z-z') \rho_W(z') \exp(-2Kz') D_{Co}(z') \quad \text{Equation (36),}$$

and $$R_{BgdXr}(z)/I_{Transmitted} = \int dz' P(z-z') \rho_W(z') \exp(-2Kz') D_{Xr}(z') \quad \text{Equation (37).}$$

Likewise, if objects are well-separated from the boundaries, the impulse responses from Equation (6) and (7) are convolved with the laser pulse shape to give:

$$R_{Obj,Co}(z)/I_{Transmitted} \approx \quad \text{Equation (38)}$$

$$\int dz' P(z-z') \begin{bmatrix} \rho_{Obj} D_{Co}(z_{Obj}) \delta(z_{Obj} - z') \\ -\rho_W(z') D_{Co}(z') \Theta(z' - z_{Obj}) \end{bmatrix} C_{Obj}(z') \exp(-2Kz') \approx$$

$$\begin{bmatrix} \rho_{Obj} P(z - z_{Obj}) D_{Co}(z_{Obj}) C_{Obj}(z_{Obj}) \exp(-2Kz_{Obj}) - \\ \int dz' P(z-z') \rho_W(z') D_{Co}(z') \Theta(z' - z_{Obj}) C_{Obj}(z') \exp(-2Kz') \end{bmatrix},$$

and:

$$R_{Obj,Xr}(z)/I_{Transmitted} \approx \qquad \text{Equation (39)}$$

$$\int dz' P(z-z') \begin{bmatrix} \rho_{Obj} D_{Xr}(z_{Obj})\delta(z_{Obj}-z') \\ -\rho_W(z')D_{Xr}(z')\Theta(z'-z_{obj}) \end{bmatrix} C_{Obj}(z')\exp(-2Kz') \approx$$

$$\begin{bmatrix} \rho_{Obj} P(z-z_{Obj})D_{Xr}(z_{Obj})C_{Obj}(z_{Obj})\exp(-2Kz_{Obj}) - \\ \int_0^\infty dz' P(z-z')\rho_W(z')D_{Xr}(z')\Theta(z'-z_{Obj})C_{Obj}(z')\exp(-2Kz') \end{bmatrix}.$$

The convolution of the total impulse response with the pulse shape for the co-polarized return is:

$$R_{Co}(z)/I_{Transmitted} = [R_{Bdg,Co}(z) + R_{Obj,Co}(z)]/I_{Transmitted} \approx \qquad \text{Equation (40)}$$

$$\begin{bmatrix} \rho_{Obj}P(z-z_{Obj})D_{Co}(z_{Obj})C_{Obj}(z_{Obj})\exp(-2Kz_{Obj}) + \\ \int dz' P(z-z')_{\rho_W}(z')\exp(-2Kz')D_{Co}(z')[1-C_{Obj}(z')\Theta(z'-z_{Obj})] \end{bmatrix},$$

and for the cross-polarized return is:

$$R_{Xr}(z)/I_{Transmitted} = [R_{Bdg,Xr}(z) + R_{Obj,Xr}(z)]/I_{Transmitted} \approx \qquad \text{Equation (41)}$$

$$\begin{bmatrix} \rho_{Obj}P(z-z_{Obj})D_{Xr}(z_{Obj})C_{Obj}(z_{Obj})\exp(-2Kz_{Obj}) + \\ \int dz' P(z-z')_{\rho_W}(z')\exp(-2Kz')D_{Xr}(z')[1-C_{Obj}(z')\Theta(z'-z_{Obj})] \end{bmatrix}.$$

Integrated over a gain function gated over the range $(z_1, z_2)$, $$R_{Co}/I_{Transmitted} \approx \begin{bmatrix} \rho_{Obj,Co}C_{Obj}(z_{Obj})\exp(-2Kz_{Obj})\int_{z_1}^{z_2} dz\, G_{Co}(z)P(z-z_{Obj}) + \\ \int_{z_1}^{z_2} dz\, G_{Co}(z) \int_0^\infty dz' P(z-z')\rho_W(z')\exp(-2Kz')D_{Co}(z')[1-C_{Obj}(z')\Theta(z'-z_{Obj})] \end{bmatrix}, \qquad \text{Equation (42)}$$

and $$R_{Xr}/I_{Transmitted} \approx \begin{bmatrix} \rho_{Obj,Xr}C_{Obj}(z_{Obj})\exp(-2Kz_{Obj})\int_{z_1}^{z_2} dz\, G_{Xr}(z)P(z-z_{Obj}) + \\ \int_{z_1}^{z_2} dz\, G_{Xr}(z) \int_0^\infty dz' P(z-z')\rho_W(z')\exp(-2Kz')D_{Xr}(z')[1-C_{Obj}(z')\Theta(z'-z_{Obj})] \end{bmatrix}. \qquad \text{Equation (43)}$$

The leading terms in Equations (42) and (43) contain joint gate/pulse response functions of the form:

$$\int_{z_1}^{z_2} dz\, G(z)P(z-z_{Obj}), \qquad \text{Equation (44)}$$

which, in the absence of scattering in the medium and any BSI, yield the shape of the LIDAR-return-versus-range curve for each pixel on the object of interest.

For the exemplary case of a laser pulse which is a rectangle function:

$$P(z) = \frac{1}{w_P}\left[\Theta\left(z - \frac{1}{2}w_P\right) - \Theta\left(z + \frac{1}{2}w_P\right)\right], \qquad \text{Equation (45)}$$

in which case Equation (44) reduces to:

$$\int_{z_1}^{z_2} dz G_{Co}(z) P(z - z_{Obj}) = \int_{z_1}^{z_2} dz G_{Co}(z) [\Theta(z_{Obj} - w_P/2) - \Theta(z_{Obj} + w_P/2)],$$

Equation (46)

so that for $G_{Co}$ equal to a constant over a gate of width $w_G$:

$$\int_{z_1}^{z_2 = z_1 + w_G} dz G_{Co}(z) P(z - z_{Obj}) =$$

Equation (47)

$$\begin{cases} 0, & z_1 < \left(z_{Obj} - w_G - \frac{w_P}{2}\right) \\ & \text{Gate too early to see object} \\ \left(\frac{w_P}{2} + z_1 + w_G - z_{Obj}\right)\frac{G_{Co}}{w_P}, & \left(z_{Obj} - w_G - \frac{w_P}{2}\right) < z_1 < \left(z_{Obj} - w_G - \frac{w_P}{2} + \max(w_G, w_P)\right) \\ & \text{Signal increases as } z_1 \text{ increases} \\ G_{Co}, & \left(z_{Obj} - w_G + \frac{w_P}{2}\right) < z_1 < \left(z_{Obj} - \frac{w_P}{2}\right) \\ & \text{Maximum signal, } w_G > w_P \\ \frac{w_G}{w_P} G_{Co}, & \left(z_{Obj} - \frac{w_P}{2}\right) < z_1 < \left(z_{Obj} - w_G + \frac{w_P}{2}\right) \\ & \text{Maximum signal, } w_G < w_P \\ \left(\frac{w_P}{2} - z_1 - z_{Obj}\right)\frac{\max(w_G, w_P) G_{Co}}{\min(w_G, w_P) w_P} & \left(z_{Obj} - w_G - \frac{w_P}{2} + \max(w_G, w_P)\right) < z_1 < \left(z_{Obj} + \frac{w_P}{2}\right) \\ & \text{Signal decreases as } z_1 \text{ increases} \\ 0, & z_1 > \left(z_{Obj} + \frac{w_P}{2}\right) \\ & \text{Gate too late to see object} \end{cases}$$

Figure 4A:
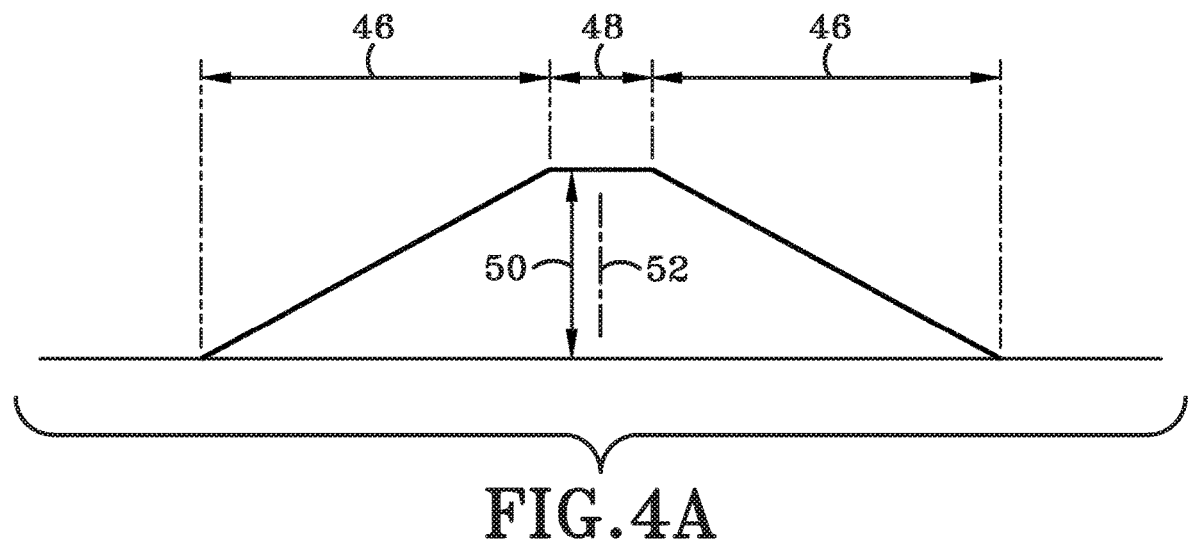
FIG. 4A depicts an exemplary joint gate/laser pulse response function where the gate width $w_G$ is greater than the pulse width $w_P$.
Figure 4B:
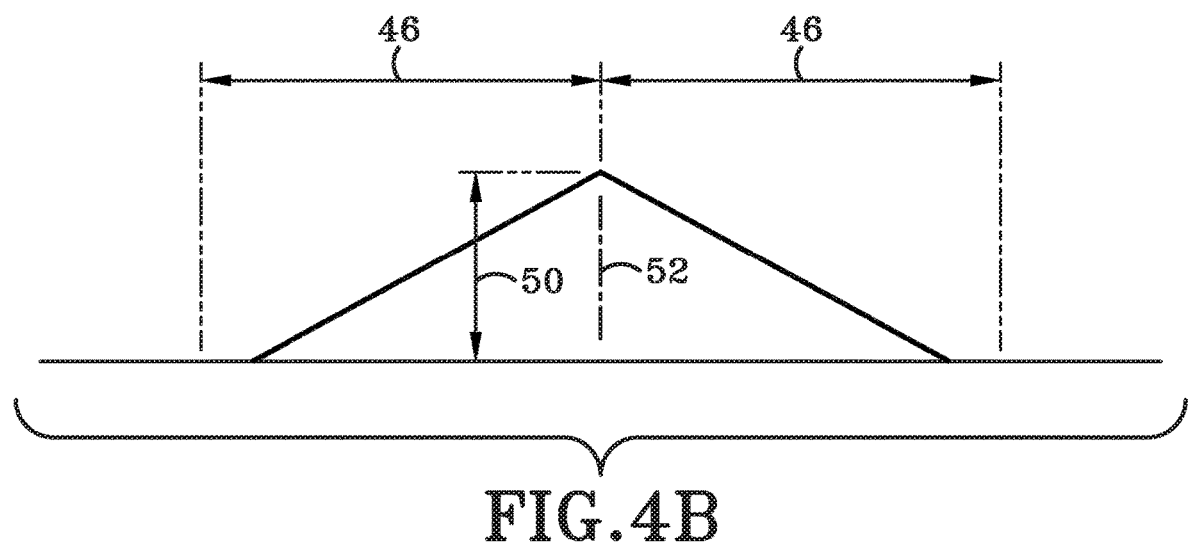
FIG. 4B depicts an exemplary joint gate/laser pulse response function where the gate width $w_G$ is equal to the pulse width $w_P$.
Figure 4C:
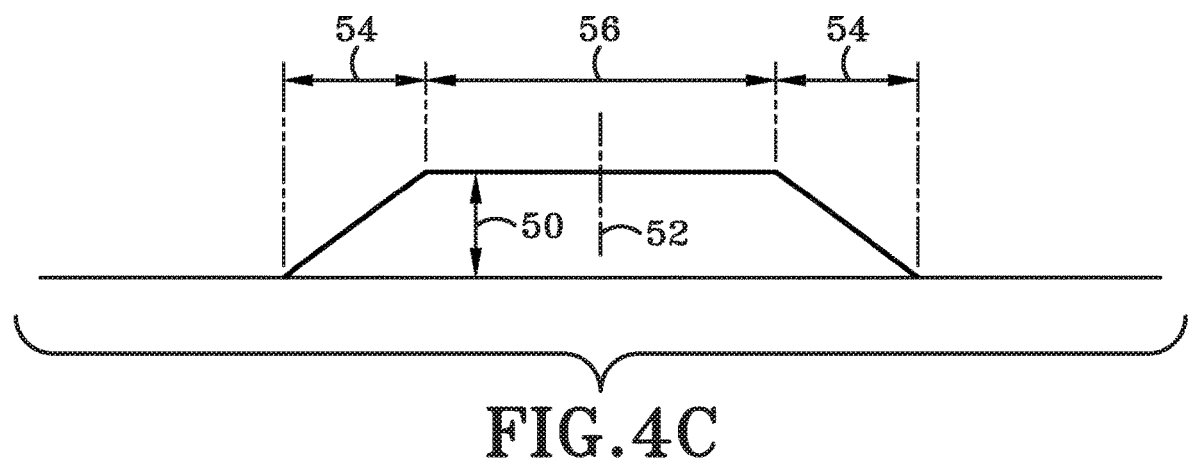
FIG. 4C depicts an exemplary joint gate/laser pulse response function where the gate width $w_G$ is less than the pulse width $w_P$.

The behavior of Equation (47) versus the range-gate start depth $z_1$ is shown in FIG. 4A, FIG. 4B, and FIG. 4C. More particularly, FIG. 4A, FIG. 4B, and FIG. 4C depict exemplary joint gate/laser pulse response functions from Equation (47). FIG. 4A depicts an exemplary case where the gate width $w_G$ is greater than the pulse width $w_P$. As shown in FIG. 4A, pulse width $w_P$ is indicated at 46, gate width $w_G$ minus pulse width $w_P$ is indicated at 48, gate length G is indicated at 50, range to the object $z_{Obj}$ is indicated at 52, and $$\left(Z_{obj} - W_G - \frac{W_P}{2}\right) < Z_1 < \left(Z_{obj} + \frac{W_P}{2}\right).$$

FIG. 4B depicts an exemplary case where the gate width $w_G$ is equal to the pulse width $w_P$. As shown in FIG. 4B, pulse width $w_P$ is indicated at 46, gate length G is indicated at 50, range to the object $z_{Obj}$ is indicated at 52, and $$\left(Z_{obj} - \frac{3W_P}{2}\right) < Z_1 < \left(Z_{obj} + \frac{W_P}{2}\right).$$

FIG. 4C depicts an exemplary case where the gate width $w_G$ is less than the pulse width $w_P$. As shown in FIG. 4C, gate width $w_G$ is indicated at 54, pulse width $w_P$ minus gate width $w_G$ is indicated at 56, gate length $$\frac{w_G}{w_P} G$$

is indicated at 50, range to the object $z_{Obj}$ is indicated at 52, and $$\left(Z_{obj} - W_G - \frac{W_P}{2}\right) < Z_1 < \left(Z_{obj} + \frac{W_P}{2}\right).$$

Equation (47)

It should be noted that true response functions will feature rounded edges, since gates and pulses cannot turn on and off with perfect sharpness.

In accordance with one aspect of the present disclosure, the case of $w_G$ $w_P$ is typically the most useful for 3D determination, because it maximizes the fraction of the response which is monotonically increasing or decreasing, and thus invertible to give range versus intensity, however, it is to be understood that any other suitable relationships between gate widths $w_G$ and pulse widths $w_P$ can be utilized.

In the absence of scattering, Equation (47) is directly proportional to the LIDAR return, so that inversion of the gate response to yield range is possible on monotonically-increasing or monotonically-decreasing portions of the response curve. For a response with substantially perfectly linear ramps given by Equation (47), the inverse for the increasing side of the response is:

$$z_{Obj} = z_{1,Increasing} + \frac{w_P}{2} + w_G - \frac{w_P}{G_{Co}} F_{Increasing}(z_{Obj}),$$

Equation (48)

and the inverse for the decreasing side of the response is:

$$z_{Obj} = z_{1,Decreasing} - \frac{w_P}{2} + \frac{w_P}{G_{Co}} \frac{\min(w_G, w_P)}{\max(w_G, w_P)} F_{Decreasing}(z_{Obj}). \quad \text{Equation (49)}$$

If the gate delay between the two images is:

$$z_{1,Decreasing} = z_{1,Increasing} + w_P \quad \text{Equation (50)},$$

then $$z_{Obj} = z_{1,Increasing} + \frac{w_P}{2} + \quad \text{Equation (51)}$$

$$\frac{F_{Decreasing}(z_{Obj}) \frac{\min(w_G, w_P)}{\max(w_G, w_P)} w_G}{\left[ F_{Increasing}(z_{Obj}) + \frac{\min(w_G, w_P)}{\max(w_G, w_P)} F_{Decreasing}(z_{Obj}) \right]}.$$

For the case of $w_G = w_P$, Equation (51) simplifies to:

$$z_{Obj} = \quad \text{Equation (52)}$$

$$z_{1,Increasing} + \frac{w_G}{2} + \frac{F_{Decreasing}(z_{Obj})}{[F_{Increasing}(z_{Obj}) + F_{Decreasing}(z_{Obj})]} w_G.$$

Equation (51) shows that, in a medium with negligible scattering or BSI, the range to a pixel on the object of interest can be simply related to the ratios of LIDAR returns with gate starts separated by the laser pulse width. As long as the target reflectance is polarization-independent (or both images are acquired with the same polarization), knowledge of the pulse energy, gain, or target reflectance is unnecessary. In practice, the range gates and the laser pulses do not turn on and off as perfect step functions, so the joint gate/pulse response functions described by the exemplary case of Equation (47) and illustrated in FIG. 4A, FIG. 4B, and FIG. 4C will feature rounded edges, since gates and pulses cannot turn on and off with perfect sharpness. As long as there are identifiable monotonically-increasing or monotonically-decreasing portions, Equation (44) can be inverted piece-wise to yield intensity-to-range curves. In a light-scattering medium, the equations are more complex:

$$R_{Co}(z)/I_{Transmitted} \approx \quad \text{Equation (53)}$$

$$\left[ \begin{array}{c} \rho_{Obj,Co} C_{Obj}(z_{Obj}) \exp(-2K z_{Obj}) G_{Co} \int_{z_1}^{z_1+w_G} dz(z) P(z - z_{Obj}) + \\ \frac{1}{w_P} \rho_W G_{Co} \int_{z_1}^{z_1+w_G} dz \int_{\max(0, z-\frac{1}{2}w_P)}^{z+\frac{1}{2}w_P} dz' \exp(-2K z') D_{Co}(z') [1 - C_{Obj}(z') \Theta(z' - z_{Obj})] \end{array} \right],$$

and, for cross-polarized light:

$$R_{Xr}(z)/I_{Transmitted} \approx \quad \text{Equation (54)}$$

$$\left[ \begin{array}{c} \rho_{Obj,Xr} C_{Obj}(z_{Obj}) \exp(-2K z_{Obj}) G_{Xr} \int_{z_1}^{z_1+w_G} dz(z) P(z - z_{Obj}) + \\ \frac{1}{w_P} \rho_W G_{Xr} \int_{z_1}^{z_1+w_G} dz \int_{\max(0, z-\frac{1}{2}w_P)}^{z+\frac{1}{2}w_P} dz' \exp(-2K z') D_{Xr}(z') [1 - C_{Obj}(z') \Theta(z' - z_{Obj})] \end{array} \right],$$

and for unpolarized light:

$$R_U(z)/I_{Transmitted} \approx \quad \text{Equation (55)}$$

$$\left[ \begin{array}{c} \rho_{Obj,U} C_{Obj}(z_{Obj}) \exp(-2K z_{Obj}) G_U \int_{z_1}^{z_1+w_G} dz(z) P(z - z_{Obj}) + \\ G_U \int_{z_1}^{z_1+w_G} dz \int_0^{\infty} dz' P(z - z') \rho_W(z') \exp(-2K z') [1 - C_{Obj}(z') \Theta(z' - z_{Obj})] \end{array} \right].$$

Exemplary effects of BSI on the joint gate/pulse response function is shown in FIG. 3A, for an unpolarized system. As shown in FIG. 3A, the ramp on the rising side of the response is bowed, introducing non-linearity in the range-from-intensity return. Because the non-linearity depends on the strength of the BSI as well as on the attenuation rate, precise calibration is difficult.

The decreasing side of the ramp shown in FIG. 3A displays much less bowing, primarily due to the attenuation rate. The reduced influence of BSI on the decreasing side of the return is due to the shadowing of the BSI by the object of interest. This can be exploited by taking the two gated images at a range separation A smaller than the pulse width $w_P$. An example of two such responses is shown in FIG. 3B.

It is instructive to consider operation of the method in the case of zero scattering. In that case, a first image is acquired with a gate-start depth $z_{1,A}$, for which the range to the object is given by:

$$z_{Obj} = z_{1,A} - \frac{w_P}{2} + \frac{w_P}{G} \frac{\min(w_G, w_P)}{\max(w_G, w_P)} F_{Decreasing,A}(z_{Obj}). \qquad \text{Equation (56)}$$

If the gate delay of the second image is:

$$z_{1,B} = z_{1,A} + \Delta \qquad \text{Equation (57),}$$

then: so that $$z_{Obj} = z_{1,A} + \Delta - \frac{w_P}{2} + \frac{w_P}{G} \frac{\min(w_G, w_P)}{\max(w_G, w_P)} F_{Decreasing,B}(z_{Obj}), \qquad \text{Equation (58)}$$

so that $$z_{Obj} = \qquad \text{Equation (59)}$$
$$\left\{ z_{1,A} - \frac{w_P}{2} + \frac{F_{Decreasing,A}(z_{Obj})}{[F_{Decreasing,A}(z_{Obj}) - F_{Decreasing,B}(z_{Obj})]} \Delta \right\}.$$

Similar to Equation (52), Equation (59) gives range to a pixel on the object solely in terms of ratios of LIDAR returns, so it is insensitive to the exact values of the gain, pulse energy, or target reflectance. In contrast to Equation (52), the same, or similar, method can be used in a light-scattering medium to yield ranges with reduced sensitivity to BSI. At least the ability to reduce BSI by exploiting two images acquired with the object of interest on the decreasing side of the responses for both gates is non-obvious and a distinct advantage over conventional methods.

Further, since:

$$D_{Xr}(z) < D_{Co}(z) < 1 \qquad \text{Equation (60),}$$

the BSI contributions to a cross-polarized return are less than for a co-polarized or unpolarized LIDAR return. Thus, if both returns are cross-polarized relative to the incident laser light, BSI is further reduced, and the contrast-versus-background of the objects increased. Most objects of interest in the ocean exhibit depolarizing reflectances, so that their reflectances are equal for co-polarized and cross-polarized light. This can be exploited by a polarimetric range-gated imager to provide the LIDAR returns in Equation (59) above.

The advantage of using a polarimetric LIDAR system is that such a system can characterize the optical parameters to model LIDAR returns via Equation (54) and Equation (55), so that the function:

$$\frac{F_{Decreasing,XrPol}(z_{Obj})}{[F_{Increasing,XrPol}(z_{Obj}) - F_{Decreasing,CoPol}(z_{Obj})]} \qquad \text{Equation (61)}$$

can be computed, and any remaining non-linear dependences characterized.

The use of rectangular pulses is a simplification for this analysis, not a requirement. For example, if the pulses are Gaussian, the gated response will include error functions with smooth turn-on and turn-off characteristics that will yield monotonic ramps that will provide valid inputs for gate-ratio calculations.

If the medium has significant scattering, the range determination is optimized by exploiting the shadows (i.e., the portions of the range gates that are on the time-late side of the object), as shown in the in the overlapping near-linear portions of the gated response 44 of FIG. 3B. In the shadows, medium backscatter is minimized, so that the signals are dominated by the solid-object reflectance.

Figure 5:
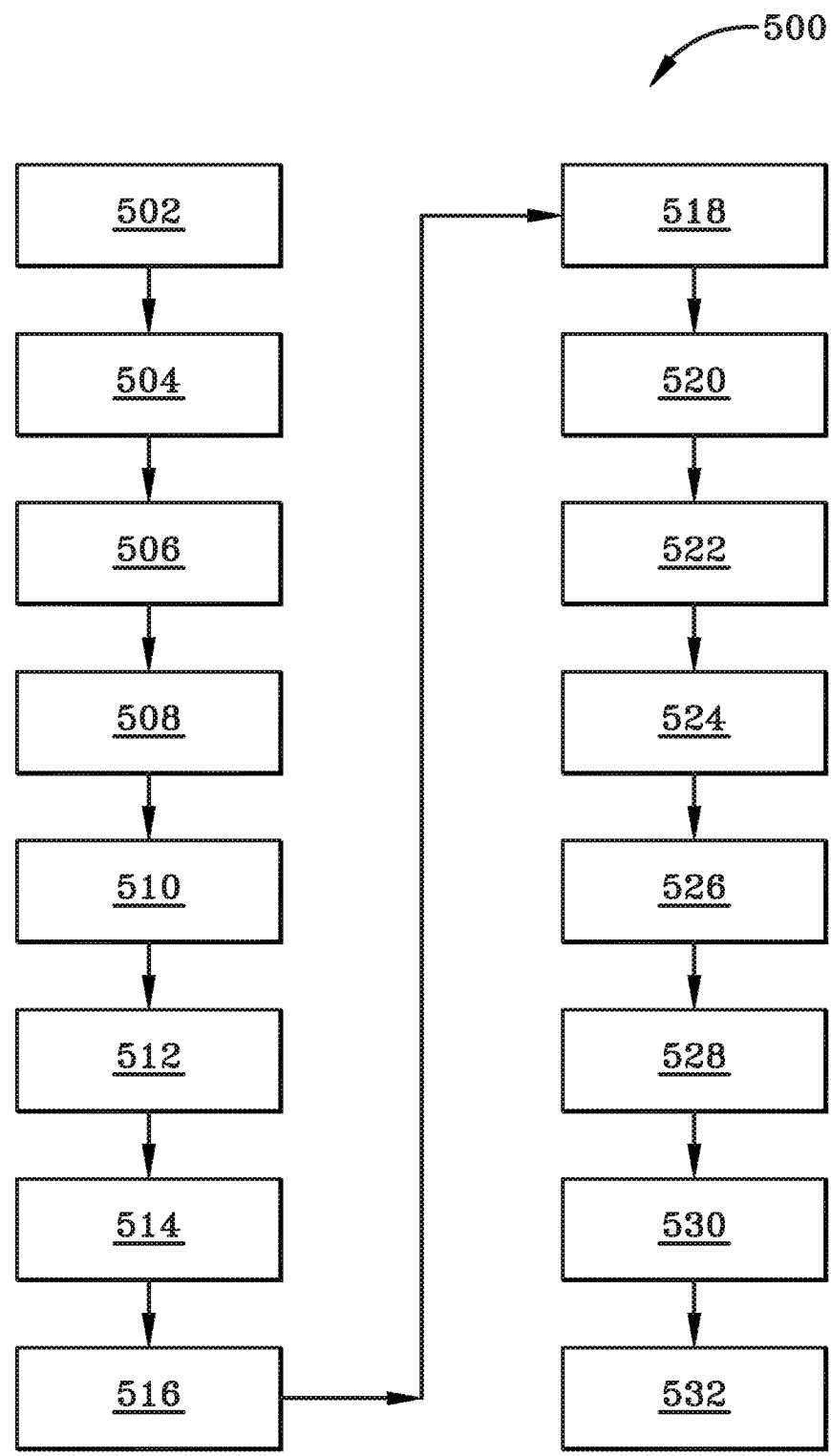
FIG. 5 is a flow chart depicting an exemplary method in accordance with one aspect of the present disclosure.

FIG. 5 depicts a method for polarimetric ranging to an object embedded in a light-scattering medium generally at 500. The method 500 includes generating polarized light via a polarized light source, which is shown generally at 502. The method 500 includes polarizing a first range-gated imager relative to the polarized light, which is shown generally at 504. The method 500 includes polarizing a second range-gated imager relative to the polarized light, which is shown generally at 506. The method 500 includes transmitting the polarized light from the polarized light source into the light-scattering medium toward the object, which is shown generally at 508. The method 500 includes receiving reflected light from the object, which is shown generally at 510. The method 500 includes generating a set of polarized images including the object, based, at least in part on the reflected light, which is shown generally at 512. The method 500 includes characterizing a depolarization rate of the light-scattering medium, based, at least in part, on the reflected light, which is shown generally at 514. The method 500 includes determining a dependence of a degree of polarization (DOP) on a range to at least one pixel on the object, which is shown generally at 516. In one example, the dependence of the DOP on the range to the at least one pixel on the object is based, at least in part, on the depolarization rate of the light-scattering medium. The method 500 includes varying a gain of the first-range gated imager and a gain of the second range-gated imager to increase sensitivity of the dependence of the DOP on the range to the at least one pixel on the object, which is shown generally at 518. The method 500 includes computing the range to the at least one pixel on the object in the set of polarized images, which is shown generally at 520. The method 500 includes estimating a three-dimensional (3D) shape of the object based, at least in part, on the computed range to the at least one pixel on the object in the set of polarized images, which is shown generally at 522.

The method 500 further includes characterizing backscatter interference received by the first range-gated imager and the second range-gated imager, which is shown generally at 524. In one example, varying the gain of the first range-gated imager and the second range-gated imager reduces the backscatter interference received by the first range-gated imager and the second range-gated imager, and reduces the dependence of the DOP on the range to the at least one pixel on the object.

The method 500 further includes characterizing backscatter interference received by the first range-gated imager and the second range-gated imager, which is shown generally at 526. In one example, varying the gain of the first range-gated imager and the second range-gated imager increases the dependence of the DOP on the range to the at least one pixel on the object. The method 500 further includes reducing the backscatter interference via modeling, which is shown generally at 528.

The method 500 further includes characterizing an attenuation rate of the light-scattering medium, based, at least in part, on the reflected light, which is shown generally at 530. In one example, the dependence of the DOP on the range to the at least one pixel on the object is based, at least in part, on the attenuation rate of the light-scattering medium.

The method 500 further includes co-polarizing one of the first range-gated imager and the second range-gated imager, and cross-polarizing the other of the first range-gated imager and the second range-gated imager, which is shown generally at 532.

Figure 6:
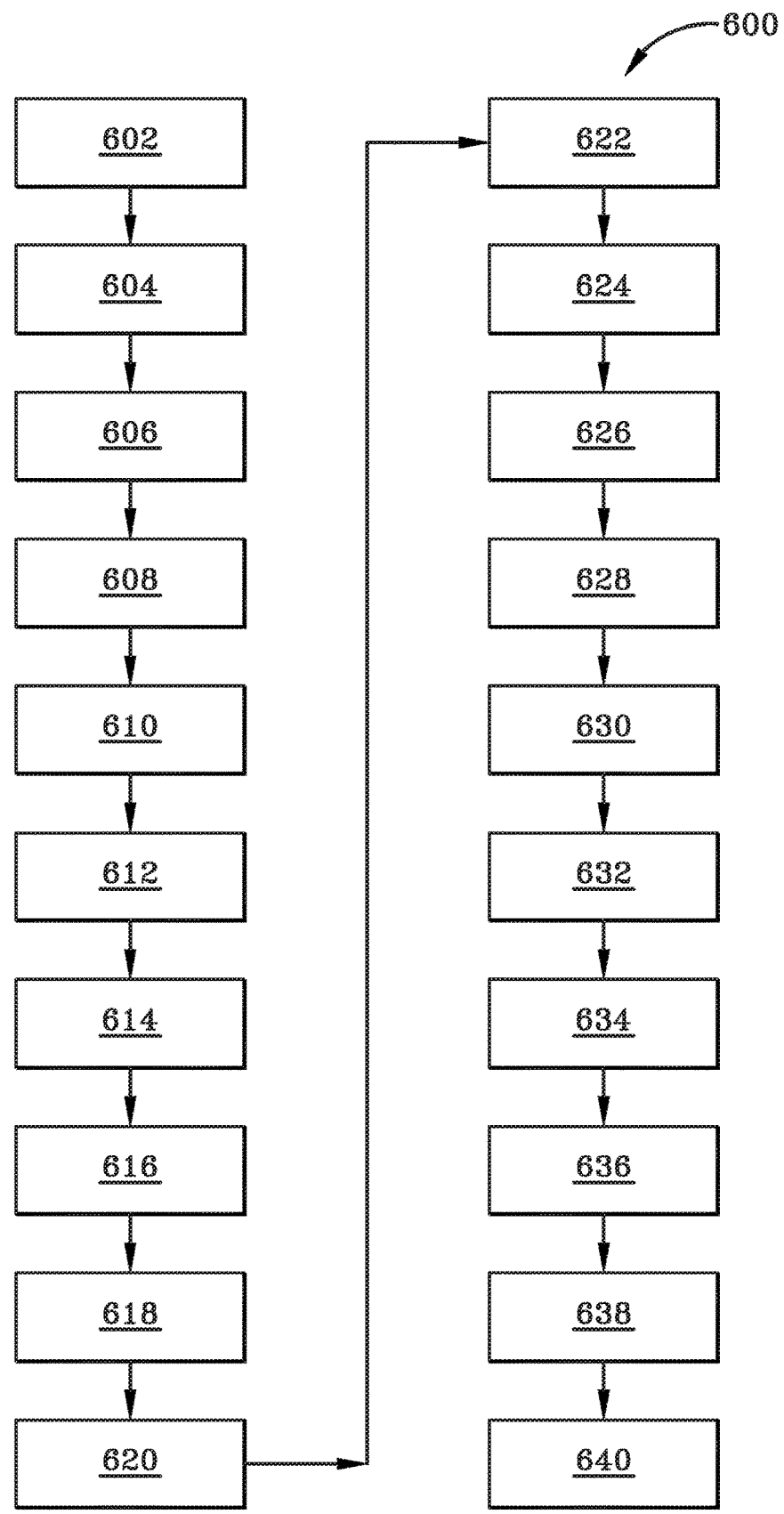
FIG. 6 is a flow chart depicting an exemplary method in accordance with one aspect of the present disclosure.

FIG. 6 depicts a method for polarimetric ranging to an object embedded in a light-scattering medium generally at 600. The method 600 includes transmitting a polarized light source into the light-scattering medium toward the object, which is shown generally at 602. The method 600 includes polarizing a first range-gated imager relative to the polarized light source, which is shown generally at 604. The method 600 includes polarizing a second range-gated imager relative to the polarized light source, which is shown generally at 606. The method 600 includes setting a delay range between the first range-gated imager and the second range-gated imager, which is shown generally at 608. The method 600 includes receiving reflected radiation from the object with the first range-gated imager and the second range-gated imager, which is shown generally at 610. The method 600 includes generating a set of polarized images including the object based, at least in part, on the reflected radiation, which is shown generally at 610. The method 600 includes characterizing backscatter interference received by the first range-gated imager and the second range-gated imager, which is shown generally at 612. The method 600 includes determining a ratio of at least two polarized images of the set of polarized images, which is shown generally at 614. The method 600 includes arranging the ratio of the at least two polarized images to reduce the backscatter interference, which is shown generally at 616. The method 600 includes computing a range to at least one pixel on the object in the at least two polarized images, based, at least in part, on the ratio of the at least two polarized images, which is shown generally at 618. The method 600 includes estimating a three-dimensional (3D) shape of the object based, at least in part, on the computed range to the at least one pixel on the object in the at least two polarized images which is shown generally at 620.

In one example, the method 600 further includes utilizing at least one linear combination of polarized images in the at least two polarized images which is shown generally at 622. In one example, the method 600 further includes cross-polarizing the first range-gated imager and the second range-gated imager relative to the polarized light source; wherein the at least two polarized images are cross-polarized which is shown generally at 624.

The method 600 further includes oppositely polarizing the first range-gated imager relative to the second range-gated imager; wherein at least one of first range-gated imager and the second range-gated imager is cross-polarized, which is shown generally at 626. The method 600 further includes oppositely polarizing at least one of the range-gated imager and the second range-gated imager relative to the polarized light source; wherein at least one of the at least two polarized images is cross-polarized, which is shown generally at 628. The method 600 further includes arranging the at least one cross-polarized image in a numerator of the ratio of the at least two polarized images, which is shown generally at 630.

The method 600 further includes generating a response-range curve to the at least one pixel on the object, wherein the at least two polarized images are generated from a decreasing portion of the response-range curve, which is shown generally at 632. The method 600 further includes convolving gate ranges of the first range-gated imager and the second range-gated imager with a pulse shape of the polarized light source, which is shown generally at 634.

In one example, the method 600 further includes setting gate widths of the first range-gated imager and the second range-gated imager equal to a pulse width of the polarized light source which is shown generally at 636. In another example, the method 600 further includes setting gate widths of the first range-gated imager and the second range-gated imager different to a pulse width of the polarized light source, which is shown generally at 638. In yet another example, the method 600 further includes setting gate widths of the first range-gated imager and the second range-gated imager different to one another, which is shown generally at 640.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral" and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately"

may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A method for polarimetric ranging to an object embedded in a light-scattering medium, comprising:
   transmitting a polarized light source into the light-scattering medium toward the object;
   polarizing a first range-gated imager relative to the polarized light source;
   polarizing a second range-gated imager relative to the polarized light source;
   setting a delay range between the first range-gated imager and the second range-gated imager;
   receiving reflected radiation from the object with the first range-gated imager and the second range-gated imager;
   generating a set of polarized images including the object based, at least in part, on the reflected radiation;
   characterizing backscatter interference received by the first range-gated imager and the second range-gated imager;
   determining a ratio of at least two polarized images of the set of polarized images;
   arranging the ratio of the at least two polarized images to reduce the backscatter interference;
   computing a range to at least one pixel on the object in the at least two polarized images, based, at least in part, on the ratio of the at least two polarized images; and
   estimating a three-dimensional (3D) shape of the object based, at least in part, on the computed range to the at least one pixel on the object in the at least two polarized images.

2. The method of claim 1, further comprising:
   including at least one linear combination of polarized images in the at least two polarized images.

3. The method of claim 1, further comprising:
   cross-polarizing the first range-gated imager and the second range-gated imager relative to the polarized light source; wherein the at least two polarized images are cross-polarized.

4. The method of claim 1, further comprising:
   oppositely polarizing the first range-gated imager relative to the second range-gated imager; wherein at least one of first range-gated imager and the second range-gated imager is cross-polarized;
   oppositely polarizing at least one of the range-gated imager and the second range-gated imager relative to the polarized light source; wherein at least one of the at least two polarized images is cross-polarized; and
   including the at least one cross-polarized image in a numerator of the ratio of the at least two polarized images.

5. The method of claim 1, further comprising:
   generating a response-range curve to the at least one pixel on the object; wherein the at least two polarized images are generated from a decreasing portion of the response-range curve.

6. The method of claim 1, further comprising:
   convolving gate ranges of the first range-gated imager and the second range-gated imager with a pulse shape of the polarized light source.

7. The method of claim 6, further comprising:
   setting gate widths of the first range-gated imager and the second range-gated imager equal to a pulse width of the polarized light source.

8. The method of claim 6, further comprising:
   setting gate widths of the first range-gated imager and the second range-gated imager different to a pulse width of the polarized light source.

9. The method of claim 6, further comprising:
   setting gate widths of the first range-gated imager and the second range-gated imager different to one another.

10. A method for polarimetric ranging to an object embedded in a light-scattering medium, comprising:
    generating polarized light via a polarized light source;
    polarizing a first range-gated imager relative to the polarized light;
    polarizing a second range-gated imager relative to the polarized light;
    transmitting the polarized light from the polarized light source into the light-scattering medium toward the object;
    receiving reflected light from the object;
    generating a set of polarized images including the object, based, at least in part on the reflected light;
    characterizing a depolarization rate of the light-scattering medium, based, at least in part, on the reflected light;
    determining a dependence of a degree of polarization (DOP) on a range to at least one pixel on the object; wherein the dependence of the DOP on the range to the at least one pixel on the object is based, at least in part, on the depolarization rate of the light-scattering medium;
    varying a gain of the first-range gated imager and a gain of the second range-gated imager to increase sensitivity of the dependence of the DOP on the range to the at least one pixel on the object;
    computing the range to the at least one pixel on the object in the set of polarized images; and estimating a three-dimensional (3D) shape of the object based, at least in part, on the computed range to the at least one pixel on the object in the set of polarized images.

11. The method of claim 10, further comprising:
characterizing backscatter interference received by the first range-gated imager and the second range-gated imager; wherein the varying the gain of the first range-gated imager and the second range-gated imager reduces the backscatter interference received by the first range-gated imager and the second range-gated imager; and wherein the varying the gain of the first range-gated imager and the gain of the second range-gated imager reduces the dependence of the DOP on the range to the at least one pixel on the object.

12. The method of claim 10, further comprising:
characterizing backscatter interference received by the first range-gated imager and the second range-gated imager; wherein the varying the gain of the first range-gated imager and the second range-gated imager increases the dependence of the DOP on the range to the at least one pixel on the object; and
reducing the backscatter interference via modeling.

13. The method of claim 10, further comprising:
characterizing an attenuation rate of the light-scattering medium, based, at least in part, on the reflected light; wherein the dependence of the DOP on the range to the at least one pixel on the object is based, at least in part, on the attenuation rate of the light-scattering medium.

14. The method of claim 10, further comprising:
co-polarizing one of the first range-gated imager and the second range-gated imager; and
cross-polarizing the other of the first range-gated imager and the second range-gated imager.

15. A system for polarimetric ranging to an object embedded in a light-scattering medium, comprising:
a polarized light source;
a first range-gated imager; wherein the first range-gated imager is polarized relative to the polarized light source;
a second range-gated imager; wherein the second range-gated imager is polarized relative to the polarized light source; and
at least one processor for:
generating a set of polarized images including the object based, at least in part, on reflected light received by the first range-gated imager and the second range-gated imager;
characterizing a depolarization rate of the light-scattering medium, based, at least in part, on the reflected light;
reducing backscatter interference;
computing a range to at least one pixel on the object in the set of polarized images; and
estimating a three-dimensional (3D) shape of the object based, at least in part, on the computed range to the at least one pixel on the object in the set of polarized images.

16. The system of claim 15, wherein the at least one processor determines a dependence of a degree of polarization (DOP) on the range to the at least one pixel on the object in the set of polarized images; wherein the dependence of the DOP on the range to the at least one pixel on the object is based, at least in part, on the depolarization rate of the light-scattering medium; and wherein the reducing the backscatter interference is accomplished by varying a gain of the first range-gated imager and a gain of the second range-gated to reduce the dependence of the DOP on the range to the at least one pixel on the object.

17. The system of claim 15, wherein the at least one processor determines a dependence of a degree of polarization (DOP) on the range to the at least one pixel on the object in the set of polarized images; wherein the dependence of the DOP on the range to the at least one pixel on the object is based, at least in part, on the depolarization rate of the light-scattering medium; wherein the reducing the backscatter interference is accomplished by varying a gain of the first range-gated imager and a gain of the second range-gated to increase the dependence of the DOP on the range to the at least one pixel on the object and reducing the backscatter interference via modeling.

18. The system of claim 15, wherein the at least one processor determines a ratio of at least two polarized images of the set of polarized images; wherein the at least one processor arranges the ratio of the at least two polarized images to reduce the backscatter interference; and wherein the computing the range to the at least one pixel on the object in the at least two polarized images is based, at least in part, on the ratio of the at least two polarized images.

19. The system of claim 18, wherein at least one of the at least two polarized images is cross-polarized; and wherein the at least one processor includes the at least one cross-polarized image in a numerator of the ratio of the at least two polarized images.

20. The system of claim 18, wherein the at least one processor generates a response-range curve to the at least one pixel on the object; and wherein the at least two polarized images are generated from a decreasing portion of the response-range curve.

* * * * *